United States Patent
Sakuragi et al.

(10) Patent No.: US 7,455,961 B2
(45) Date of Patent: Nov. 25, 2008

(54) COPOLYMER AND PHOTOTHERMOGRAPHIC MATERIAL CONTAINING THE SAME

(75) Inventors: Rie Sakuragi, Kanagawa (JP); Osamu Ishige, Kanagawa (JP); Kiyoshi Fukusaka, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/859,389

(22) Filed: Sep. 21, 2007

(65) Prior Publication Data

US 2008/0085482 A1    Apr. 10, 2008

(51) Int. Cl.
G03C 1/00       (2006.01)
G03C 1/005     (2006.01)
G03C 1/494     (2006.01)

(52) U.S. Cl. .................. 430/617; 430/618; 430/619; 430/620; 430/627; 430/964

(58) Field of Classification Search ......... 430/617–620, 430/964, 627
See application file for complete search history.

(56) References Cited

U.S. PATENT DOCUMENTS 6,063,866 A    5/2000    Wang et al.
7,094,526 B2 *  8/2006    Ando et al. .................. 430/617
2005/0095541 A1    5/2005    Ando et al.
2006/0099539 A1    5/2006    Ito et al.

FOREIGN PATENT DOCUMENTS

| WO | 9829502 | 7/1998 |
| WO | 9829508 | 7/1998 |
| WO | 9934043 | 7/1999 |
| WO | 2006106387 | 10/2006 |

* cited by examiner

*Primary Examiner*—Geraldina Visconti
(74) *Attorney, Agent, or Firm*—Lucas & Mercanti, LLP

(57) ABSTRACT

Disclosed is a photothermographic material comprising on support a light-insensitive silver salt of an aliphatic carboxylic acid, a light-sensitive silver halide and a reducing agent for silver ions, wherein the photothermographic material further comprises a copolymer comprising a backbone comprising a chain having a monomeric repeating unit, represented by formula (1) and a chain having a monomeric repeating unit, represented by formula (2).

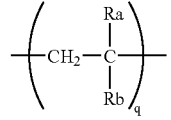

13 Claims, No Drawings

COPOLYMER AND PHOTOTHERMOGRAPHIC MATERIAL CONTAINING THE SAME

This application claims priority from Japanese Patent Application No. JP2006-272702 filed on Oct. 4, 2006, which is incorporated hereinto by reference.

FIELD OF THE INVENTION

The present invention relates to a copolymer exhibiting enhanced compatibility with silver halide emulsion and a photothermographic material containing the copolymer.

BACKGROUND OF THE INVENTION

In the field of medical treatment, there have been concerns in processing of imaging materials with respect to effluent produced from wet-processing, and recently, reduction of the processing effluent has been strongly demanded in terms of environmental protection and space saving. There has been desired a photothermographic material for photographic use, capable of forming distinct black images exhibiting high sharpness, enabling efficient exposure by means of a laser imager or a laser image setter.

There are known, as such a technique, silver salt photothermographic materials comprising an organic silver salt, light-sensitive silver halide and a reducing agent on a support, as described in "Dry Silver Photographic Materials" (Handbook of Imaging Materials, Marcel Dekker, Inc. page 48, 1991) U.S. Pat. Nos. 3,152,904 and 3,487,075. Such a silver salt photothermographic material, which does not employ any solution type processing chemical, can provide users a simple and environment-friendly system.

In one aspect, this photothermographic material contains, in the image forming layer (light-sensitive layer), a light-sensitive silver halide as a photosensor and a light-insensitive silver salt of an aliphatic carboxylic acid as a silver ion source, and is thermally developed usually at 80° C. or higher by an included reducing agent for silver ions (hereinafter also denoted simply as a reducing agent) to form an image, without performing fixation.

However, such a photothermographic material, in which an organic silver salt and light-sensitive silver halide are contained together with a reducing agent, readily causes fogging, resulting in practical problems. Further, in the process of emulsion making, a conventional silver halide emulsion employs, as a protective colloid, a hydrophilic dispersant such as gelatin, producing problems upon exposure of silver halide emulsion grains to an hydrophobic organic solvent, which causes aggregation or ripening. On the other hand, there are many advantages in the prior art of using hydrophilic gelatin as a protective colloid, for instance, a technique of forming silver halide grains in water, a chemical sensitization technique by use of water-soluble sensitizers and a setting storage technique by use of a hydrophilic gelatin as a protective colloid, and there is not resolved the problem that silver halide grains coagulate in a hydrophobic solvent.

Conventionally, aqueous-dispersed silver halide grains were mixed in the stage of preparing aliphatic acid silver salt grains, producing problems such as loss of development initiating points (lowering of image density) due to ripening/aggregation of silver halide grains and increased fogging (during development and after storage) caused by increased chance of being brought into contact with an aliphatic acid silver salt. Probability of silver halide grain being brought into contact with an aliphatic acid silver salt increases with change in phase from a liquid to a thin layer. Contact probability with the aliphatic acid silver salt was conventionally controlled by lowering the silver density by the matrix binder content in the film. However, lowering the silver density results in reduced thermal development speed, producing problems which hinder rapid access.

Recently, there is an increased necessity for nano-order microparticles in various fields and is noted a technique of dispersing nano-particles. However, there are several hurdles to achieving a technique of dispersing inorganic particles such as silver halide grains in a resinous solvent, because the surface of inorganic microparticles is generally hydrophilic, rendering it difficult to disperse the particles in organic solvents. There was disclosed a technique in which, to disperse hydrophilic inorganic particles in lipophilic solvents, a hydrophobic dispersing agent is attached as a protective colloid through a chemical bond to the surface of hydrophilic inorganic particles to achieve dispersion of the particles in a lipophilic solvent, as described in JP-A No. 5-111631 (hereinafter, the term JP-A refers to Japanese Patent Application Publication).

There is not known in the prior art a technique of dispersing lipophilic particles in which a hydrophobic dispersant is applied to aqueous-dispersible hydrophilic protective colloid particles.

There was disclosed, as an amphiphilic dispersion system, a thermally sensitive polymer of which hydrophilicity/hydrophobicity is reversibly changeable at a phase transition temperature, being a threshold value, as described in JP-A No. 7-276792. However, this technique is thermally reversible, resulting in a defect that variation of modification in water and hydrophobic solvents is greatly limited.

There was disclosed, as a technique of hydrophilic protective colloidal particles covered with a lipophilic polymer also exhibiting hydrophobicity, the use of a polymer obtained by random copolymerization of a hydrophilic monomer and a hydrophobic monomer, as described in JP-A 2005-166696. However, it was difficult to balance hydrophilicity and hydrophobicity in a random copolymer and was also not sufficient as a technique for balancing adsorption onto hydrophilic protective colloidal particles and dispersion in a hydrophobic solvent.

In order to achieve enhancement of both adsorption onto hydrophilic particles and dispersion in a hydrophobic solvent, a block copolymer is more preferable than a random copolymer. It is assumed that formation of a block of a hydrophilic portion and also a block of a hydrophobic portion facilitates display of their functions and also balances hydrophilicity and hydrophobicity.

Production of an amphiphilic block copolymer employed a method of preparing a polymer by use of a polymeric initiator containing a hydrophilic group or a hydrophobic group. Specifically, there were reported some methods for preparing an amphiphilic block copolymer by using a polymeric initiator containing a polyoxyalkylene group, as described in JP-A Nos. 2001-288233, 2002-97236 and 2006-88131. However, there was not reported any example of dispersing highly hydrophilic particles such as silver halide grains using gelatin as a protective colloid in a hydrophobic solvent by use of an amphiphilic block copolymer prepared by allowing a hydrophobic polymer to copolymerize with a polymeric initiator containing a polyoxyalkylene group.

SUMMARY OF THE INVENTION

It is an object of the invention to obtain an amphiphilic block copolymer capable of dispersing hydrophilic protective colloid particles in a hydrophobic solvent and to provide a photothermographic material using the copolymer and exhibiting an enhanced maximum image density and reduced fog density.

The object of the invention is realized by the following constitution:

One aspect of the invention is directed to a photothermographic material comprising on a support a light-insensitive silver salt of an aliphatic carboxylic acid, a light-sensitive silver halide and a reducing agent for silver ions, wherein the photothermographic material further comprises a copolymer comprising a backbone comprising at least a chain having a repeating unit which is represented by formula (1) and at least a chain having a repeating unit which is represented by formula (2):

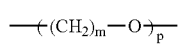
formula (1)

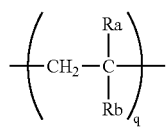
formula (2)

wherein in formula (1), m is 2 or 3 and p is an integer of 5 to 1000; in formula (2), q is an integer of 5 to 1000, Ra is a hydrogen atom or an alkyl group, and Rb is a hydrogen atom or a substituent.

Another aspect of the invention is directed to a photothermographic material comprising a copolymer comprising a backbone comprising at least a chain having a repeating unit which is represented by formula (1), at least a chain having a repeating unit which is represented by formula (3) and at least a chain having a repeating unit which is represented by formula (4):

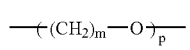
formula (1)

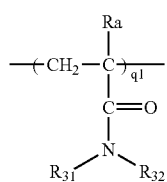
formula (3)

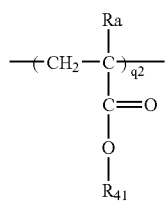
formula (4)

wherein in formula (1), m is 2 or 3 and p is an integer of 5 to 1000; in formula (3), $R_{31}$ and $R_{32}$ are each a hydrogen atom or a substituent, Ra is a hydrogen atom or an alkyl group and q1 is an integer of 5 to 1000; in formula (4), $R_{41}$ is a hydrogen atom or a substituent, Ra is a hydrogen atom or an alkyl group and q2 is an integer of 5 to 1000.

Another aspect of the invention is directed to a photothermographic material comprising a copolymer comprising a backbone having a chain comprised of a repeating unit which is represented by formula (1) and a chain comprised of a repeating unit which is represented by formula (5):

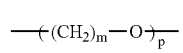
formula (1)

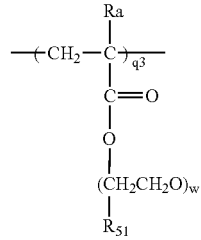
formula (5)

wherein in formula (1), m is 2 or 3 and p is an integer of 5 to 1000; in formula (5), $R_{51}$ is a hydrogen atom or a substituent, w is an integer of 3 to 300, Ra is a hydrogen atom or an alkyl group, and q3 is an integer of 5 to 1000.

Another aspect of the invention is directed to a copolymer comprising a backbone having a chain comprised of a repeating unit which is represented by the foregoing formula (1) and a chain comprised of a repeating unit which is represented by foregoing formula (5).

In the invention, silver halide grains are homogeneously dispersed in an organic solvent. Therefore, even when mixed with a dispersion of prepared aliphatic acid silver salt grains, homogeneous distribution of silver halide grains is maintained, causing no coagulation. Accordingly, there can be provided a photothermographic material exhibiting minimized fogging, enhanced sensitivity, high density and superior storage stability.

DETAILED DESCRIPTION OF THE INVENTION

First, there will be described an amphiphilic dispersion of silver halide grains, containing a copolymer relating to the invention.

Silver Halide Grain Amphiphilic Dispersion:

From the viewpoint of improvement of photographic performance and silver image color, it is preferred that coagulation of silver halide grains is prevented, whereby the silver halide grains are relatively homogeneously dispersed and developed silver is finally controlled to a desired form.

In silver halide emulsions, there is used gelatin to prevent coagulation and achieve homogeneous dispersion. In gelatin used therein, it is preferred to chemically modify, by a hydrophobic group, a hydrophilic group such as an amino group or a carboxyl group contained in gelatin according to the usage condition, whereby characteristics of gelatin is modified. Examples of hydrophobilization modification of an amino group contained in a gelatin molecule include phenylcarbamoylation, phthalation, succination, acetylation, benzoylation and nitrophenylation, but are not limited to these. The substitution ratio is preferably not less than 95%, and more preferably not less than 99%. Modification for hydrophobilization of a carboxyl group may be combined and includes, for example, methyl-esterification and amidation, but is not limited to these. The foregoing hydrophobic group to perform hydrophobilization modification of a hydrophilic group is a group which is substituted for an amino group and/or carboxyl group of a gelatin to enhance hydrophobicity.

When applying a silver halide emulsion to a hydrophobic solvent system, it is preferred to use a copolymer comprising a chain having a repeating unit represented by formula (1) and a chain having a repeating unit represented by formula (2) in terms of the use of gelatins in the hydrophobic solvent system.

There will be described copolymers relating to the invention.

A copolymer relating to the invention comprises a backbone having at least a chain having a repeating unit represented by the above-described formula (1) and at least a chain having a repeating unit represented by the above-described formula (2).

In the formula (1), m is 2 or 3, preferably 2 and p is an integer of 5 to 1000, preferably 10 to 500, and more preferably 10 to 200.

In one preferred embodiment of the invention, the chain having a repeating unit, represented by the foregoing formula (1) may be provided by a polymeric initiator used in the process of synthesizing the copolymer of the invention. Such a polymeric initiator providing the repeating unit of formula (1) may be any polymeric initiator having a polyoxyethylene group in the molecule, and examples thereof include a polymeric initiator having a side-chain containing a radical-forming group capable of being photolytically decomposable or being thermally activated. Examples of such a polymeric initiator include polymeric initiators containing a peroxide group, a hydrogen peroxide group, a perester group or an azo group, or a ketone. Of these, it is specifically preferred to use an azo initiator, which is a polyethylene glycol with an attached an azo group. Such an azo initiator or azo group-containing polyoxyethylene compounds are commercially available, for example, "VPE" series (e.g., VPE-0201, VPE-0401, VPE-0601, produced by Wako Junyaku Co.), in which plural polyethylene oxide segments are linked via an azo group, as shown below.

Formula:

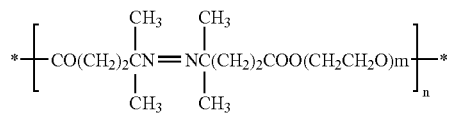

| | VPE-0201 | VPE-0401 | VPE-06011 |
|---|---|---|---|
| Mn*[1] | $1.5 \times 10^4 - 3 \times 10^4$ | $2.5 \times 10^4 - 4 \times 10^4$ | $2.5 \times 10^4 - 4 \times 10^4$ |
| *[2] | Ca. 2,000 (m ≈ 45) | Ca. 4,000 (m ≈ 91) | Ca. 2,000 (m ≈ 136) |
| *[3] | Ca. 0.45 mmol/g | Ca. 0.24 mmol/g | Ca. 0.16 mmol/g |

*[1]: Molecular weight of an initiator
*[2]: Molecular weight of a polyethylene oxide moiety
*[3]: Mole number of an azo group per g of VPE In the foregoing formula (2), q is an integer of 5 to 1000, preferably 10 to 500. Ra represents a hydrogen atom or an alkyl group. Specific examples of the alkyl group of Ra include methyl, ethyl, propyl, isopropyl, tert-butyl, pentyl, hexyl, cyclohexyl, and octyl groups. Ra is preferably a hydrogen atom or a methyl group.

Rb is a hydrogen atom or a substituent. Specific examples of a substituent of Rb include an alkyl group (e.g., methyl, ethyl, propyl, isopropyl, tert-butyl, pentyl, hexyl), a cycloalkyl group (e.g., cyclohexyl, cyclopentyl), an aromatic group (e.g., phenyl), a heterocyclic group (e.g., pyridyl, thiazolyl, oxazolyl, imidazolyl, furyl, pyrrolyl, pirazinyl, pyrimidinyl, pyridazinyl, selenazolyl, sulfolanyl, piperidinyl, pyrazolyl, tetrazolyl), an alkoxy group (e.g., methoxy, ethoxy, propyloxy, pentyloxy, cyclopentyloxy, hexyloxy, cyclohexyloxy), an aryloxy group (e.g., phenoxy), analkoxycarbonyl group (e.g., methyloxycarbonyl, ethyloxycarbonyl, butyloxycarbonyl), an aryloxycarbonyl group (e.g., phenyloxycarbonyl), an amido group (e.g., acetoamide, propioneamido, isopropylmino, butaneamido, hexaneamido, benzamido), an amino group (e.g., amino, ethylamino, dimethylamino, butylamino, cyclopentylamino, anilino, 2-pyridylamino), a halogen atom (e.g., chlorine atom, bromine atom, iodine atom, fluorine atom), a sulfoneamido group (e.g., methanesulfone amido, ethanesulfoneamido, butanesulfoneamido, hexanesulfoneamido, cyclohexanesulfoneamido, benzenesulfoneamido), a sulfamoyl group (e.g., aminosulfonyl, methylaminosulfonyl, dimethylaminosulfonyl, butylaminosulfonyl, hexylaminosulfonyl, cyclohexylaminosulfonyl, phenylaminosulfonyl, 2-pyridylaminosulfonyl), a ureido group (e.g., methylureido, ethylureido, pentylureido, cyclohexylureido, phenylureido, 2-pyridylureido), an acyl group (e.g., acetyl, propionyl, butanoyl, hexanoyl, cyclohexanoyl, benzoyl, pyridinoyl), a carbamoyl group (e.g., aminocarbamoyl, methylaminocarbamoyl, dimethylaminocarbamoyl, propylaminocarbamoyl, pentylaminocarbamoyl, cyclohexylaminocarbamoyl, phenylaminocarbamoyl, 2-pyridylaminocarbonyl), a cyano group, nitro group, a sulfo group, a carboxy group, hydroxyl group, and oxamoyl group. These groups may further substituted by these substituents.

In the copolymer relating to the invention, the chain having a monomeric repeating unit, represented by the formula (2) preferably comprises a chain having a monomeric repeating unit, as represented by the following formula (3):

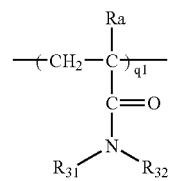

formula (3)

wherein Ra is the same as defined in formula (2) $R_{31}$, and $R_{32}$ are each a hydrogen atom or a substituent; Ra is a hydrogen atom or an alkyl group; q1 is an integer of 5 to 1000.

Preferably, at least 10 mol % of monomeric repeating units constituting the chain represented by formula (2), based on monomeric repeating unit, is accounted for by a chain comprised of a repeating unit represented by formula (3), and the whole of the chain having a repeating unit represented by formula (2) may be a chain represented by formula (3).

In the formula (3), $R_{31}$ and $R_{32}$ are each a hydrogen atom or a substituent. Specific examples of a substituent of $R_{31}$ and $R_{32}$ include an alkyl group (e.g., methyl, ethyl, propyl, isopropyl, tert-butyl, pentyl, hexyl), a cycloalkyl group (e.g., cyclohexyl, cyclopentyl), an aromatic group (e.g., phenyl), a heterocyclic group (e.g., pyridyl, thiazolyl, oxazolyl, imidazolyl, furyl, pyrrolyl, pirazinyl, pyrimidinyl, pyridazinyl, selenazolyl, sulfolanyl, piperidinyl, pyrazolyl, tetrazolyl), and an acyl group (e.g., acetyl, propionyl, butanoyl, hexanoyl, cyclihexanoylm benzoyl, pyridinoyl).

$R_{31}$ and $R_{32}$ are each preferably a hydrogen atom, an alkyl group having 1 to 10 carbon atoms and an acyl group, and more preferably a hydrogen atom, methyl, ethyl, isopropyl, n-butyl, iso-butyl and an acyl group.

In the copolymer relating to the invention, the chain having a monomeric repeating unit, represented by the formula (2) preferably comprises a chain having a monomeric repeating unit, as represented by the following formula (4):

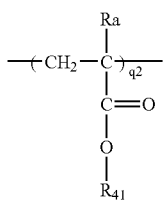

formula (4)

wherein $R_{41}$ is a hydrogen atom or a substituent; Ra is a hydrogen atom or an alkyl group; q2 is an integer of 5 to 1000.

Preferably, at least 5 mol % of monomeric repeating units constituting the chain represented by formula (2), based on monomeric repeating unit, is accounted for by a chain comprised of a repeating unit represented by formula (4), and the whole of the chain having a repeating unit represented by formula (2) may be a chain represented by formula (4).

In formula (4), $R_{41}$ is a hydrogen atom or a substituent. Specific examples of a substituent of $R_{41}$ include an alkyl group (e.g., methyl, ethyl, propyl, isopropyl, tert-butyl, pentyl, hexyl), a cycloalkyl group (e.g., cyclohexyl, cyclopentyl), an aromatic group (e.g., phenyl), a heterocyclic group (e.g., pyridyl, thiazolyl, oxazolyl, imidazolyl, furyl, pyrrolyl, pirazinyl, pyrimidinyl, pyridazinyl, selenazolyl, sulfolanyl, piperidinyl, pyrazolyl, tetrazolyl), and an acyl group (e.g., acetyl, propionyl, butanoyl, hexanoyl, cyclihexanoylm benzoyl, pyridinoyl), a polyoxyethylene group and a polyoxypropylene group.

$R_{41}$ is preferably an alkyl group having 1 to 30 carbon atom (preferably 6 to 30 carbon atoms), a polyoxyethylene group or a polyoxypropylene group, and more preferably an alkyl group having 10 to 30 carbon atoms or —$(CH_2CH_2O)_m$—[$CH(CH_3)CH_2O]_nR_{42}$, in which m is an integer of 1 to 300, n is an integer of 0 to 300, and $R_{42}$ is a hydrogen atom or a substituent (preferably a hydrogen atom or an alkyl group having 1 to 10 carbon atoms, and more preferably a hydrogen atom, methyl, or ethyl).

In the copolymer relating to the invention, the chain having a monomeric repeating unit, represented by the formula (2) preferably comprises a chain having a monomeric repeating unit, as represented by the following formula (5):

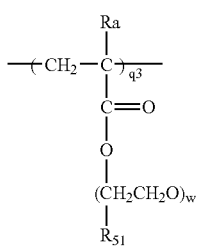

formula (5)

wherein $R_{51}$ is a hydrogen atom or a substituent; w is an integer of 3 to 300; Ra is a hydrogen atom or an alkyl group; q3 is an integer of 5 to 1000.

Preferably, at least 5 mol % of monomeric repeating units constituting the chain represented by formula (2), based on monomeric repeating unit, is accounted for by a chain comprised of a repeating unit represented by formula (5), and the whole of the chain having a repeating unit represented by formula (2) may be a chain represented by formula (5).

In formula (5), $R_{51}$ is a hydrogen atom or a substituent. Specific examples of a substituent of $R_{51}$ include an alkyl group (e.g., methyl, ethyl, propyl, isopropyl, tert-butyl, pentyl, hexyl), a cycloalkyl group (e.g., cyclohexyl, cyclopentyl), an aromatic group (e.g., phenyl), a heterocyclic group (e.g., pyridyl, thiazolyl, oxazolyl, imidazolyl, furyl, pyrrolyl, pirazinyl, pyrimidinyl, pyridazinyl, selenazolyl, sulfolanyl, piperidinyl, pyrazolyl, tetrazolyl), and an acyl group (e.g., acetyl, propionyl, butanoyl, hexanoyl, cyclihexanoylm benzoyl, pyridinoyl), a ethyleneoxy group and a propyleneoxy group.

In formula (5), w is an integer of 3 to 300, preferably 3 to 200, and more preferably 5 to 150.

The copolymer of the invention comprises a chain having a repeating unit represented by formula (1) and a chain having a repeating unit represented by formula (2). The kind of chains is not limited to these two kinds of chains but other monomer or chain may be included. However, the chain having a monomeric repeating unit, represented by formula (1) and the chain having a monomeric repeating unit, represented by formula (2) account for at least 80 mol % of the whole copolymer, based on monomeric repeating unit, preferably at least 90 mol % and more preferably at least 98 mol %.

In the invention, a copolymer comprising at least three of a chain having a repeating unit represented by formula (1), a chain having a repeating unit represented by formula (3) and a chain having a repeating unit represented by formula (4) is preferred, and a copolymer comprising at least three of a chain having a repeating unit represented by formula (1), a chain having a repeating unit represented by formula (3) and a chain having a repeating unit represented by formula (5) is more preferred.

The copolymer of the invention can be synthesized by commonly known methods, for example, as described in JP-A No. 2002-97236. One preferred embodiment of the invention is supply from a polymeric initiator containing a chain having a repeating unit represented by formula (1). The polymeric initiator supplying the repeating unit of formula (1) may be any one of polymer initiators containing a polyoxyethylene group within the molecule, and is, for example, a polymeric initiator comprising a side-chain containing a radical-forming group capable of being photolytically decomposable or being thermally activated. Examples of such a group include a peroxide group, a hydrogen peroxide group, a perester or azo group, and a ketone. Of these is preferred an azo initiator of a polyethylene glycol with an attached an azo group.

Polymerization reaction is performed according to the known method, for example, in a solution by using a polymeric initiator containing a polyoxyethylene group in the molecule together with an unsaturated vinyl compound as a monomer component of a copolymer.

Examples of the copolymer relating to the invention and the synthesis methods thereof are shown in synthesis examples described later.

The copolymer of the invention preferably is a copolymer soluble in water and organic solvents. Examples of organic solvents include alcohol, ester and ketone compounds. Specifically, ketone compounds such as acetone, methyl ethyl ketone and diethyl ketone are preferred as an organic solvent.

To incorporate the copolymer of the invention into a photothermographic material, an aqueous silver halide grain dispersion containing gelatin as a protective colloid is dispersed in a dispersing medium of organic solvents together with the copolymer to obtain a silver halide grain amphiphilic dispersion.

A copolymer of the invention is a amphiphilic polymer exhibiting affinity for water and organic solvents. When a solution of the copolymer dissolved in a hydrophilic solvent is mixed with light-sensitive silver halide grains (silver halide emulsion) which was prepared with a gelatin (water-soluble polymer) as a protective colloid, such a water-based silver halide emulsion is homogeneously dispersed and held in the organic solvent solution of the copolymer. Thereafter, water is removed by means of distillation, ultrafiltration or the like and if necessary, a finally usable solvent (e.g., solvent used for preparing coating solution) is added. Further, the concentration is adjusted through distillation and replacement with a desired solvent, e.g., methyl ethyl ketone, is also feasible, whereby homogeneous dispersion of silver halide grains can be maintained. Thus, there can be obtained an organic solvent dispersion of light-sensitive silver halide grains, in which conversion to a desired organic solvent system is achieved by using the copolymer of the invention. The thus obtained silver halide dispersion, together with light-insensitive aliphatic carboxylic acid silver salt and a reducing agent for silver ions is coated on the support to form a light-sensitive layer, whereby a photothermographic material is obtained.

A copolymer of the invention is incorporated in a photothermographic material of the invention, preferably in a ratio by mass of copolymer to silver halide of from 0.2 to 2.5, more preferably from 0.3 to 2.0, and still more preferably from 0.5 to 1.5. A ratio by mass of less than 0.2 is insufficient to cover light-sensitive silver halide, resulting in deteriorated dispersion stability in organic solvent and causing aggregation. A ratio by mass of more than 2.5, which is an excessive amount to protect silver halide, results in coagulation due to an excessive amount of copolymer.

There will be described elements constituting a photothermographic material relating to the invention.

Light-sensitive Silver Halide

Light-sensitive silver halide grains (hereinafter, also denoted simply as silver halide grains) used in the invention are those which are capable of absorbing light as an inherent property of silver halide crystal or capable of absorbing visible or infrared light by artificial physico-chemical methods, and which are treated or prepared so as to cause a physicochemical change in the interior and/or on the surface of the silver halide crystal upon absorbing light within the region of ultraviolet to infrared.

The silver halide grains used in the invention can be prepared according to conventionally known methods. Any one of acidic precipitation, neutral precipitation and ammoniacal precipitation is applicable and the reaction mode of aqueous soluble silver salt and halide salt includes single jet addition, double jet addition and a combination thereof. Specifically, preparation of silver halide grains with controlling the grain formation condition, so-called controlled double-jet precipitation is preferred.

The grain forming process is usually classified into two stages of formation of silver halide seed crystal grains (nucleation) and grain growth. These stages may continuously be conducted, or the nucleation (seed grain formation) and grain growth may be separately performed. The controlled double-jet precipitation, in which grain formation is undergone with controlling grain forming conditions such as pAg and pH, is preferred to control the grain form or grain size. In cases when nucleation and grain growth are separately conducted, for example, a soluble silver salt and a soluble halide salt are homogeneously and promptly mixed in an aqueous gelatin solution to form nucleus grains (seed grains), thereafter, grain growth is performed by supplying soluble silver and halide salts, while being controlled at a pAg and pH to prepare silver halide grains. After completion of grain formation, soluble salts are removed in the desalting stage, using commonly known desalting methods such as the noodle method, flocculation method, ultrafiltration method and electrodialysis method.

Silver halide grains are preferably monodisperse grains with respect to grain size. The monodisperse grains as described herein refer to grains having a coefficient of variation of grain size obtained by the formula described below of not more than 30%; more preferably not more than 20%, and still more preferably not more than 15%:

Coefficient of variation of grain size (%)=standard deviation of grain diameter/average grain diameter×100

The grain form can be of almost any one, including cubic, octahedral or tetradecahedral grains, tabular grains, spherical grains, bar-like grains, and potato-shaped grains. Of these, cubic grains, octahedral grains, tetradecahedral grains and tabular grains are specifically preferred.

The aspect ratio of tabular grains is preferably 1.5 to 100, and more preferably 2 to 50. These grains are described in U.S. Pat. Nos. 5,264,337, 5,314,798 and 5,320,958 and desired tabular grains can be readily obtained. Silver halide grains having rounded corners are also preferably employed.

Crystal habit of the outer surface of the silver halide grains is not specifically limited, but in cases when using a spectral sensitizing dye exhibiting crystal habit (face) selectivity in the adsorption reaction of the sensitizing dye onto the silver halide grain surface, it is preferred to use silver halide grains having a relatively high proportion of the crystal habit meeting the selectivity. In cases when using a sensitizing dye selectively adsorbing onto the crystal face of a Miller index of [100], for example, a high ratio accounted for by a Miller index [100] face is preferred. This ratio is preferably at least 50%; is more preferably at least 70%, and is most preferably at least 80%. The ratio accounted for by the Miller index [100] face can be obtained based on T. Tani, J. Imaging Sci., 29, 165 (1985) in which adsorption dependency of a [111] face or a [100] face is utilized.

It is preferred to use low molecular gelatin having an average molecular weight of not more than 50,000 in the preparation of silver halide grains used in the invention, specifically, in the stage of nucleation. Thus, the low molecular gelatin has an average molecular eight of not more than 50,000, preferably 2,000 to 40,000, and more preferably 5,000 to 25,000. The average molecular weight can be determined by means of gel permeation chromatography. The low molecular weight gelatin can be obtained by adding an enzyme to conventionally used gelatin having a molecular weight of ca. 100,000 to perform enzymatic degradation, by adding acid or alkali with heating to perform hydrolysis, by heating under atmospheric pressure or under high pressure to perform thermal degradation, or by exposure to ultrasonic. The concentration of dispersion medium used in the nucleation stage is preferably not more than 5% by mass, and more preferably 0.05 to 3.0% by mass.

In the preparation of silver halide grains, it is preferred to use a compound represented by the following formula, specifically in the nucleation stage:

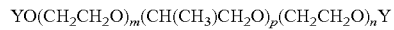

$YO(CH_2CH_2O)_m(CH(CH_3)CH_2O)_p(CH_2CH_2O)_nY$ where Y is a hydrogen atom, —SO$_3$M or —CO—B—COOM, in which M is a hydrogen atom, alkali metal atom, ammonium group or ammonium group substituted by an alkyl group having carbon atoms of not more than 5, and B is a chained or cyclic group forming an organic dibasic acid; m and n each are 0 to 50; p is 1 to 100.

Polyethylene oxide compounds represented by foregoing formula have been employed as a defoaming agent to inhibit marked foaming occurred when stirring or moving emulsion raw materials, specifically in the stage of preparing an aqueous gelatin solution, adding a water-soluble silver and halide salts to the aqueous gelatin solution or coating an emulsion on a support during the process of preparing silver halide photographic light sensitive materials. A technique of using these compounds as a defoaming agent is described in JP-A No. 44-9497. The polyethylene oxide compound represented by the foregoing formula also functions as a defoaming agent during nucleation. The compound represented by the foregoing formula is used preferably in an amount of not more than 1%, and more preferably 0.01 to 0.1% by mass, based on silver.

The compound is to be present at the stage of nucleation, and may be added to a dispersing medium prior to or during nucleation. Alternatively, the compound may be added to an aqueous silver salt solution or halide solution used for nucleation. It is preferred to add it to a halide solution or both silver salt and halide solutions in an amount of 0.01 to 2.0% by mass. It is also preferred to make the compound represented by formula [5] present over a period of at least 50% (more preferably, at least 70%) of the nucleation stage.

The temperature during the stage of nucleation is preferably 5 to 60° C., and more preferably 15 to 50° C. Even when nucleation is conducted at a constant temperature, in a temperature-increasing pattern (e.g., in such a manner that nucleation starts at 25° C. and the temperature is gradually increased to reach 40° C. at the time of completion of nucleation) or its reverse pattern, it is preferred to control the temperature within the range described above.

Silver salt and halide salt solutions used for nucleation are preferably in a concentration of not more than 3.5 mol/l, and more preferably 0.01 to 2.5 mol/l. The flow rate of aqueous silver salt solution is preferably $1.5 \times 10^{-3}$ to $3.0 \times 10^{-1}$ mol/min per liter of the solution, and more preferably $3.0 \times 10^{-3}$ to $8.0 \times 10^{-2}$ mol/min. per liter of the solution.

The pH during nucleation is within a range of 1.7 to 10, and since the pH at the alkaline side broadens the grain size distribution, the pH is preferably 2 to 6. The pBr during nucleation is 0.05 to 3.0, preferably 1.0 to 2.5, and more preferably 1.5 to 2.0.

The average grain size of silver halide of the invention is preferably 10 to 50 nm, more preferably 10 to 40 nm, and still more preferably 10 to 35 nm. An average grain size of less than 10 nm often lowers the image density or deteriorated storage stability under light exposure (aging stability when images obtained in thermal development is used for diagnosis under room light or aged under ambient light). An average grain size of more than 50 nm results in lowered image density.

In the invention, the grain size refers to an edge length of the grain in the case of regular grains such as cubic or octahedral grains. In the case of tabular grains, the grain size refers to a diameter of a circle equivalent to the projected area of the major face. In the case of irregular grains, such as spherical grains or bar-like grains, the diameter of a sphere having the same volume as the grain is defined as the grain size. Measurement is made using an electron microscope and grain size values of at least 300 grains are average and defined as an average grain size.

The combined use of silver halide grains having an average grain size of 55 to 100 nm and silver halide grains having an average grain size of 10 to 50 nm not only can control the gradation of image density but also can enhance the image density or improve (or reduce) lowering in image density during storage. The ratio (by weight) of silver halide grains having an average grain size of 10 to 50 nm to silver halide grains having an average grain size of 55 to 100 nm is preferably from 95:5 to 50:50, and more preferably form 90:10 to 60:40.

When two silver halide emulsions differing in average grain size are used in combination, these emulsions may be blended and incorporated to the light-sensitive layer. To make adjustment of gradation, the light-sensitive layer divided to at least two layers and two silver halide emulsions differing in average grain size are contained in the respective layers.

Light-insensitive Aliphatic Carboxylic Acid Silver Salt

Light-insensitive silver salts of aliphatic carboxylic acids (hereinafter, also denoted as aliphatic carboxylic acid silver salts or simply as silver aliphatic carboxylates) usable in this invention are relatively stable to light but are capable of functioning as a silver ion supplier upon being heated at a temperature of more than 100° C. in the presence of light-sensitive silver halide grains and a reducing agent to form a silver image. The light-insensitive aliphatic carboxylic acid silver salts may be may be any aliphatic carboxylic acid salt capable of supplying silver ions which are reducible by a reducing agent. Aliphatic carboxylic acid silver salts are preferably long chain aliphatic carboxylic acid silver salts having 10 to 30 (preferably 15 to 28) carbon atoms. Preferred examples of a long chain aliphatic carboxylic acid silver salt include silver lignocerate, silver behenate, silver arachidate, silver stearate, silver oleate, silver laurate, silver capronate, silver myristate, silver palmitate, and erucic acid silver salt.

Aliphatic carboxylic acid silver salt used in this invention contains 70-99 mol % silver behenate, and preferably 80-90 mol % silver behenate. An aliphatic carboxylic acid silver salt preferably contains erucic acid silver salt at not more than 2 mol %, more preferably not more than 1 mol %, and still more preferably 0.1 mol %.

The average sphere equivalent diameter of light-insensitive aliphatic carboxylic acid silver salt particles is 0.05 to 0.5 μm, and preferably 0.10 to 0.5 μm. The particle size distribution thereof is preferably monodisperse. Monodispersibility (or degree of dispersion) can be represented by a standard deviation of average diameter. In one feature of the invention, the standard deviation of aliphatic carboxylic acid silver salt particles used in this invention is 0.3 or less and preferably 0.2 or less.

The particle size and the particle size distribution can be determined by several conventional methods for measurement of particle size distribution, such as laser diffractometry, a centrifugal sedimentation light transmission method, an X-ray transmission method, an electric detector band method, a masking method, an ultrasonic attenuation spectroscopy and a method of calculation from images. Of these, laser diffractometry and the method of calculation from images are preferred for microparticles, and laser diffractometry is more preferred. Aliphatic carboxylic acid silver salt particles dispersed in liquid can be measured using a commercially available laser diffraction apparatus for particle size distribution determination.

Measurement of particle size and particle size distribution can be carried out as follows. Into a 100 ml beaker is placed 0.01 g of an aliphatic carboxylic acid silver salt particle sample. Further thereto, 0.1 g of a nonionic surfactant (NS-210, produced by Nippon Yushi Co., Ltd.) and 40 ml of water were added and dispersed at room temperature using an ultrasonic homogenizer to obtain a dispersion. The obtained dispersion is measured using a laser diffraction apparatus for particle size distribution measurement (SALD-2000, produced by Shimazu Seisakusho Co., Ltd.) to determine the average particle size and the standard deviation.

To prepare a dispersion of light-insensitive aliphatic carboxylic acid silver salt particles exhibiting an average sphere equivalent diameter of 0.05 to 0.5 μm and a standard deviation of sphere equivalent diameter, as afore-described, reaction is performed preferably by the following mixing method.

Aliphatic carboxylic acid silver salt particles of the invention are prepared preferably by allowing a silver ion-containing solution to react with a solution or suspension of an aliphatic carboxylic acid alkali metal salt. Such a silver ion-containing solution is preferably an aqueous silver nitrate solution and a solution (or suspension) of an aliphatic carboxylic acid alkali metal salt is preferably an aqueous solution or suspension thereof. Both solutions are mixed preferably by double-jet addition using a transfer means (e.g., pump) with controlling the flow rate of the respective solutions. The solutions may be added onto the surface or into the interior of the mother liquid. In the invention, however, mixing via a transfer means is preferred. Mixing in a transfer means signifies line mixing (or line blending). Thus, a silver ion containing solution and a solution or suspension of an aliphatic carboxylic acid alkali metal salt are mixed before being introduced into a batch for stocking a reaction mixture containing products. Any stirring means of the mixing section may be applicable, for example, mechanical stirring such as a homomixer, static mixer or a turbulent-flow mixing, but it is preferred not to use mechanical stirring. In the foregoing mixing in a transfer means, there may be mixed a third liquid, such as water or a reaction mixture stocked in the batch, in addition to a silver ion containing solution and a solution or suspension of an aliphatic carboxylic acid alkali metal salt.

The concentration of an aqueous silver nitrate solution is preferably 1 to 15% by weight and that of an aqueous solution or suspension of an aliphatic carboxylic acid alkali metal salt is preferably 1 to 5% by weight. A lower concentration than the foregoing lower limit results in deteriorated productivity and a higher concentration than the upper limit renders it difficult to control the particle size and the particle size distribution falling within the required region of this invention. The molar ratio of silver nitrate to an aliphatic carboxylic acid alkali metal salt is preferably 0.9 to 1.1. A molar ratio falling outside the foregoing region not only renders it difficult to control the particle size and the particle size distribution falling within the region required in this invention but also leads to a reduced yield of the aliphatic carboxylic acid silver salt or formation of silver oxide, causing fogging.

The thus prepared aliphatic carboxylic acid silver salt is preferably washed and then dried. Washing is performed mainly for the purpose of removing unreacted ions. Taking into account the subsequent drying stage, organic solvents may be used for washing. Washing is carried out preferably at a temperature of 50° C. or lower, and more preferably 30° C. or lower. Washing at a temperature higher than 50° C. renders it difficult to control the particle size and the particle size distribution falling within the region required in this invention. Drying is carried out preferably at a temperature lower than the phase transition temperature of an aliphatic carboxylic acid silver salt, and more preferably at a temperature of 50° C. or lower. Drying at a temperature higher than the phase transition temperature renders it difficult to control the particle size and the particle size distribution falling within the region required in this invention.

The aliphatic carboxylic acid silver salt of this invention is prepared preferably in the absence of light-sensitive silver halide grains. Preparation in the presence of light-sensitive silver halide renders it difficult to control the particle size and the particle size distribution falling within the region required in this invention, in compatibility with reduced fogging.

The aliphatic carboxylic acid silver salt may be used in any amount but the total silver amount of an aliphatic carboxylic acid silver salt and silver halide is preferably 0.8 to 1.5 g/m$^2$, and more preferably 1.0 to 1.3 g/m$^2$.

Alkali metal salts usable in this invention include, for example, sodium hydroxide, potassium hydroxide and lithium hydroxide. It is preferred to use a single alkali metal salt of these, for example, potassium hydroxide. The combined use of sodium hydroxide and potassium hydroxide is also preferred. The molar ratio of sodium hydroxide to potassium hydroxide is preferably in the range of 10:90 to 75:25. The foregoing range can suitably control the viscosity of a reaction mixture when reacted with an aliphatic carboxylic acid to form its alkali metal salt.

An emulsion containing aliphatic carboxylic acid silver salt particles according to the present invention is a mixture consisting of free aliphatic carboxylic acids which do not form silver salts, and aliphatic carboxylic acid silver salts. In view of storage stability of images, it is preferable that the ratio of the former is lower than the latter. Namely, the aforesaid emulsion according to the present intention preferably contains aliphatic carboxylic acids in an amount of 3 to 10 mol percent with respect to the aforesaid aliphatic carboxylic acid silver salt particles, and most preferably from 4 to 8 mol percent.

Dye/Pigment

It is preferred to form a filter layer on the same side as or on the opposite side to the light sensitive layer or to allow a dye or pigment to be contained in the light sensitive layer to control the amount of wavelength distribution of light transmitted through the light sensitive layer of photothermographic materials relating to this invention. Commonly known compounds having absorptions in various wavelength regions can used as a dye, in response to spectral sensitivity of the photothermographic material. In cases where the photothermographic material are applied as an image recording material using infrared light is preferred the use of squarilium dye containing a thiopyrylium nucleus (also called as thiopyrylium squarilium dye), squarilium dye containing a pyrylium nucleus (also called as pyrylium squarilium dye), thiopyrylium chroconium dye similar to squarilium dye or pyrylium chroconium. The compound containing a squarilium nucleus is a compound having a 1-cyclobutene-2-hydroxy-4one in the molecular structure and the compound containing chroconium nucleus is a compound having a 1-cyclopentene-2-hydroxy,4,5-dione in the molecular structure, in which the hydroxy group may be dissociated. Hereinafter, these dyes are collectively called a squarilium dye. Further, compounds described in U.S. Pat. No. 5,380,635, JP-A Nos. 8-201959, 2002-040593, 2003-186135 and 2003-195450; U.S. Pat. No. 6,689,547 and U.S. Patent Application publication No. 20040259044 are also preferred as a dye.

Reducing Agent

In the invention, a compound represented by the following formula (1) is preferably used as a reducing agent for silver ions, singly or in combination with other reducing agents:

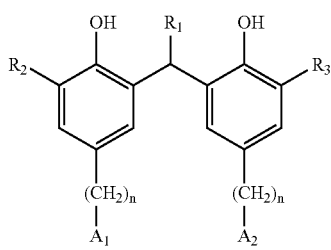

formula (1)

Reducing agents used in combination with the foregoing reducing agent are also preferably bis-phenol type reducing agents. Examples of a reducing agent used in combination with the reducing agent of formula (1) include those described in JO-A No. 11-65021, paragraph [0043]-[0045]; European Patent Application Publication EP 083764 A1, page 7, line 34 to page 18, line 12; JP-A No. 2003-302723, paragraph [0127]-[0133]; JP-A No. 2003-315954, paragraph [0124]-[0127]; and JP-A No. 2004-4650, paragraph [0042]-[0057]. The compound of formula (1) is contained preferably in the layer containing an organic silver salt, but may also be contained in an adjacent non-image-forming layer.

In the foregoing formula (1), $R_1$ is a hydrogen atom or a substituent. Examples of a substituent include an alkyl group, a cycloalkyl group, an alkenyl group, an alkynyl group, an aryl group, a heterocyclic group, a halogen atom and a cyano group. Of these, a hydrogen atom, an alkyl group, a cycloalkyl group or an alkenyl group is preferred, a hydrogen atom or an alkyl group is more preferred and a hydrogen atom is still more preferred. These substituents may further be substituted. Examples of such a substituent include an alkyl group, a cycloalkyl group, a halogenated alkyl group, an alkenyl group, alkynyl group, an aryl group, a heterocyclic group, a halogen atom, cyano group, hydroxy group, carboxy group, an alkoxy group, an aryloxy group, silyloxy group, heterocyclic-oxy group, an acyloxy group, a carbamoyloxy group, an alkoxycarbonyloxy group, an aryloxycarbonyloxy group, an amino group, an anilino group, an acylamino group, an aminocarbonylamino group, an alkoxycarbonylamino group, an aryloxycarbonylamino group, a sulfamoylamino group, an alkyl- or aryl-sulfonylamino group, mercapto group, an alkylthio group, an arylthio group, a heterocyclic-thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic-azo group, an imido group, a silyl group, a hydrazine group, a ureido group, a boronic acid group, a phosphate group, sulfate group and other substituent groups.

$R_2$ and $R_3$ are each a branched alkyl group or a cycloalkyl group. Examples of such a branched alkyl group include tert-butyl, tert-amyl, isopropyl, isobutyl, 1,1-dimethylbutyl, 1-methylbutyl, 1,3-dimethylbutyl, 1-methylpropyl, 1,1,2-trimethylpropyl, and 1-ethyl-1-methylpropyl. Examples of a cycloalkyl group include cyclohexyl, cyclopentyl, cyclobutyl, 1-methylcyclohexyl, 1-methylcyclopentyl, 1-methylcyclobutyl and 1-methylcyclopropyl. $R_{12}$ and $R_{13}$ are each preferably 1-methylcyclohexyl, tert-butyl, 1,1-dimethylbutyl or tert-amyl, and more preferably t-butyl. These branched alkyl group and cycloalkyl group may be substituted and examples of a substituent include a hydroxyl group, a cyano group, a mercapto group, a halogen atom, an amino group, an imido group, a silyl group and a hydrazine group.

$A_1$ and $A_2$ are each a hydroxy group or a group capable of forming a hydroxy group upon deprotection, and preferably a hydroxy group. The group capable of forming a hydroxy group upon deprotection is a group which is cleaved (or deprotected) under the action of an acid and/or heat to form a hydroxy group. Specific examples thereof include an ether group (e.g., methoxy, tert-butoxy, allyoxy, benzoyloxy, triphenylmethoxy, trimethylsilyloxy), a hemiacetal group (e.g., tetrahydropyranyloxy), an ester group (e.g., acetyloxy, benzoyloxy, p-nitrobenzoyloxy, formyloxy, trifluoroacetyloxy, pivaloyloxy), a carbonate group (e.g., ethoxycarbonyloxy, phenoxycarbonyloxy, tert-butyloxycarbonyloxy), a sulfonate group (e.g., p-toluenesulfonyloxy, benzenesulfonyloxy), a carbamoyloxy group (e.g., phenylcarbamoyloxy), a thiocarbonyloxy group (e.g., benzylthiocarbonyloxy), a nitric acid ester group, and a sulphenato group (e.g., 2,4-dinitrobenzenesulphenyloxy).

In formula (1), n and m are each an integer of 3 to 5, preferably 3 or 4, and more preferably 3.

The structure of substituents $R_1$, $R_2$, $R_3$, $A_1$ and $A_2$ is one of factors determining thermal properties and crystallinity of bisphenol type reducing agents, and the melting point, thermal decomposition temperature and crystallinity of a reducing agent are greatly related with photographic performance.

In the case when applied to photothermographic materials relating to the invention, the melting point of a reducing agent is preferably from 80 to 250° C. and the heat-decomposition temperature is preferably not less than 200° C. In the case when a reducing agent remains in a photothermographic material after development, a highly crystalline reducing agent is inhibited in diffusion during storage, leading to reduced variation in for density, so that a reducing agent exhibiting higher crystallinity is more preferred.

Specific examples of a reducing agent represented by formula (1) are shown below but are by no means limited to these.

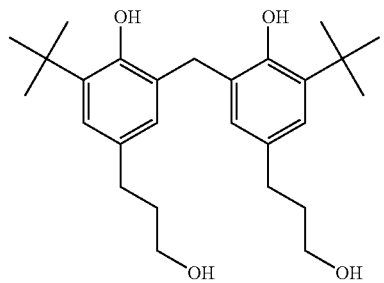

1-1

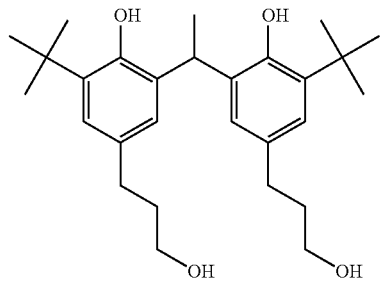

1-2

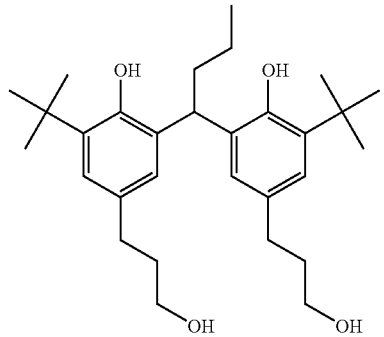

1-3

-continued
1-4
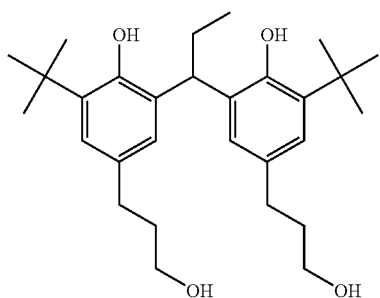
1-5
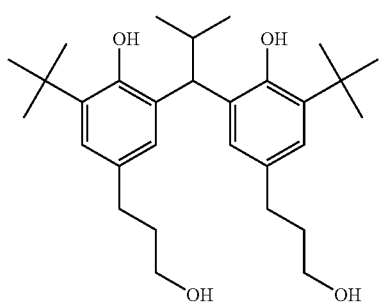
1-6
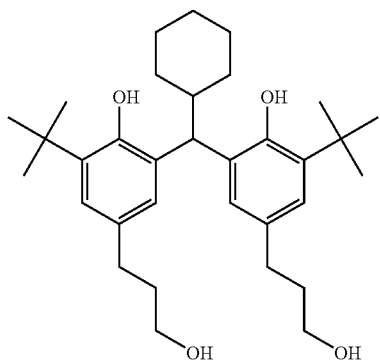
1-7
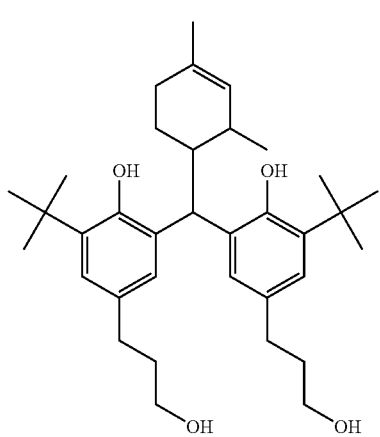
-continued
1-8
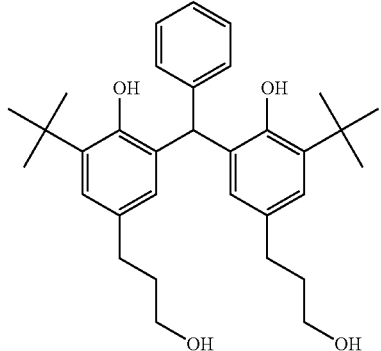
1-9
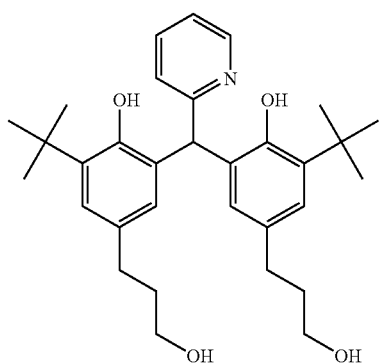
1-10
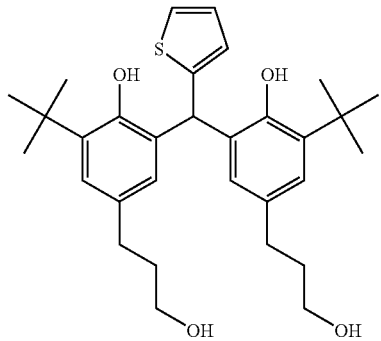
1-11
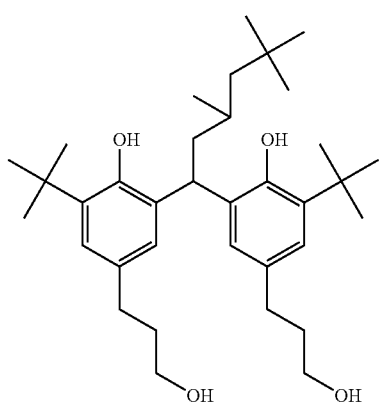

-continued
1-12
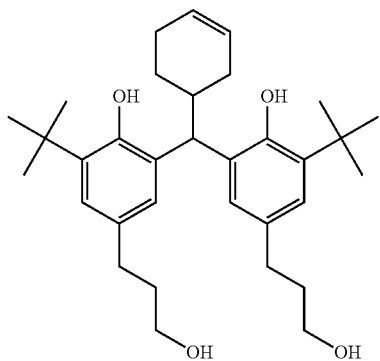
1-13
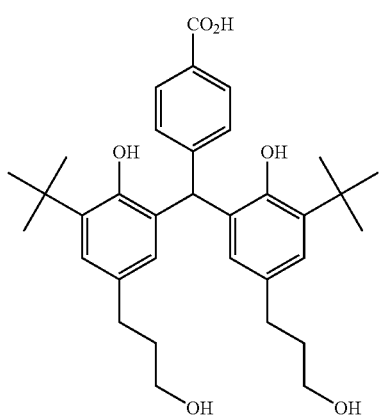
1-14
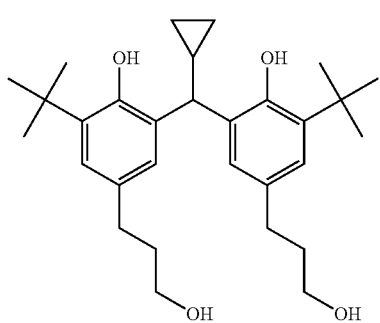
1-15
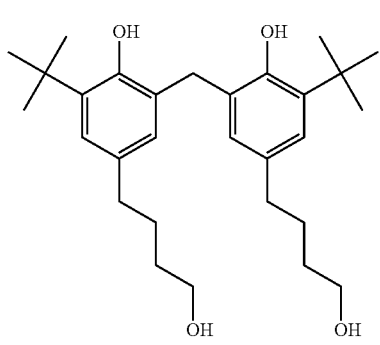
-continued
1-16
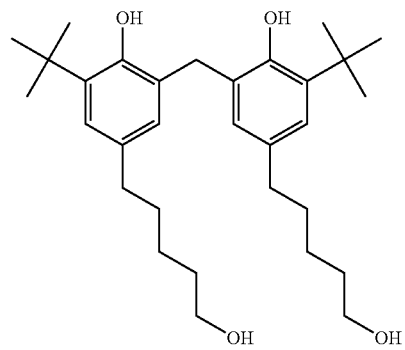
1-17
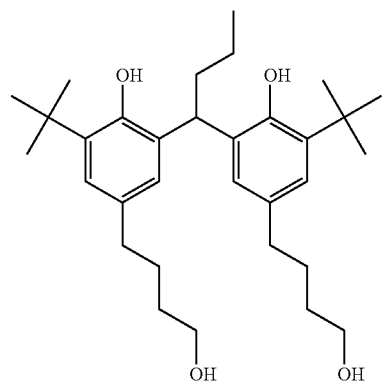
1-18
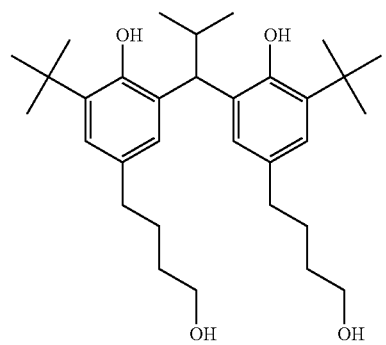
1-19
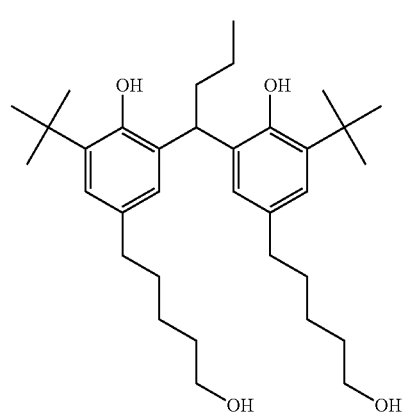

-continued
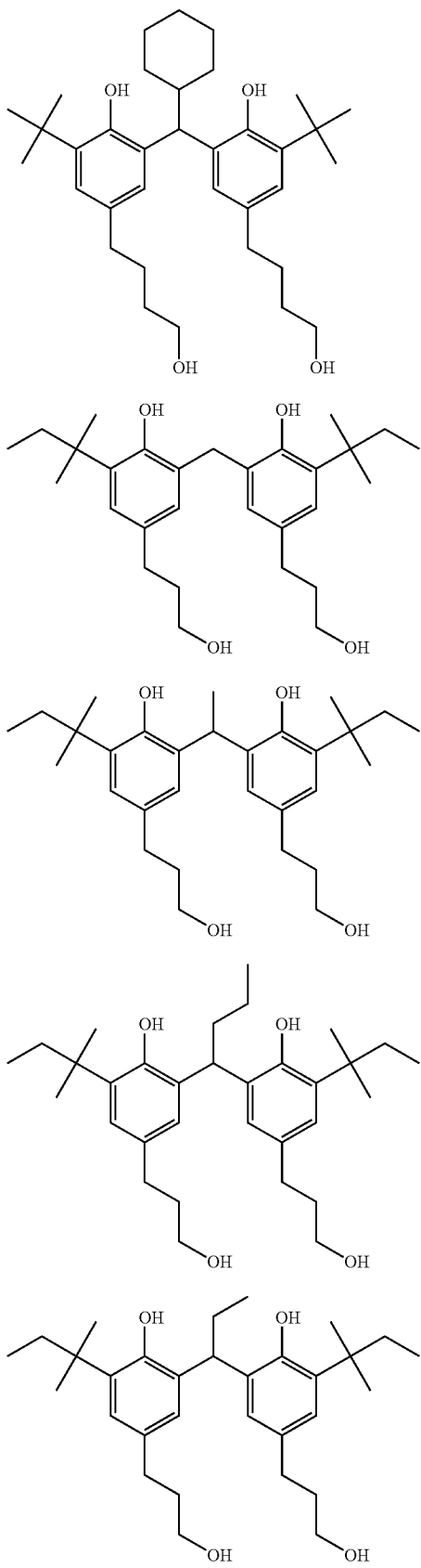
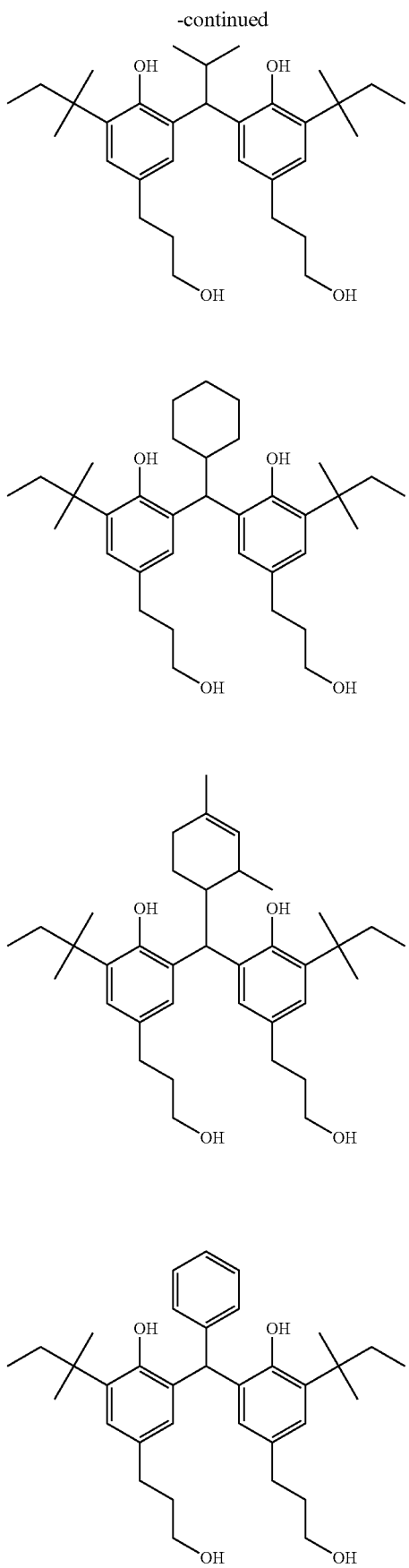

-continued
1-29
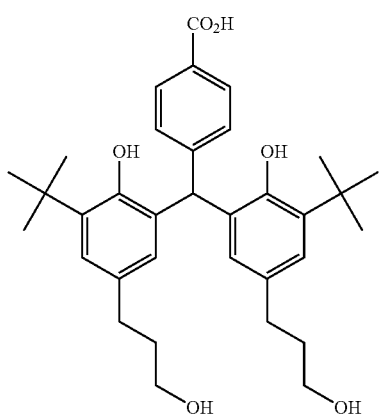
1-30
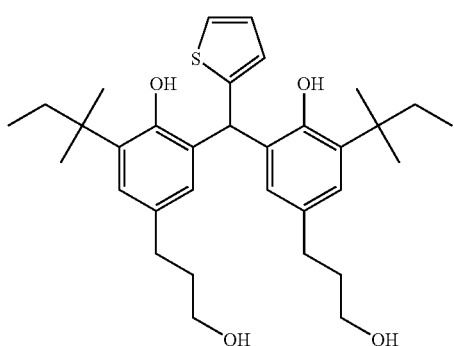
1-31
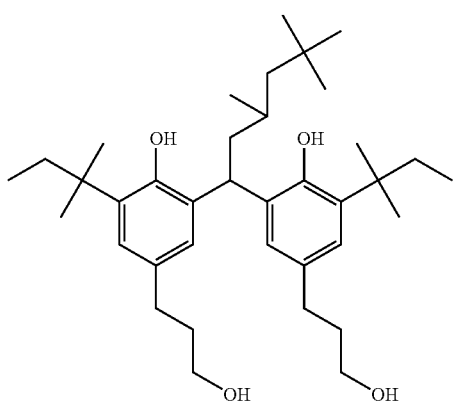
1-32
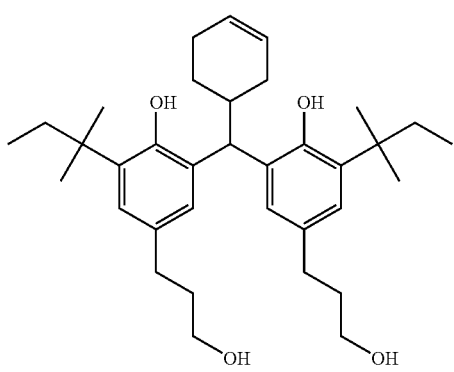
-continued
1-33
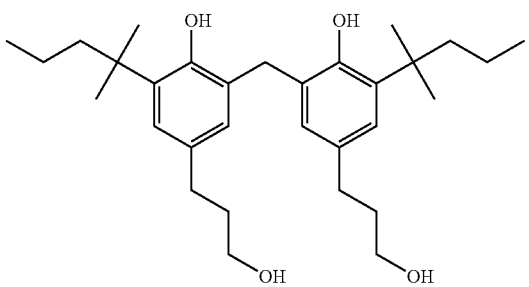
1-34
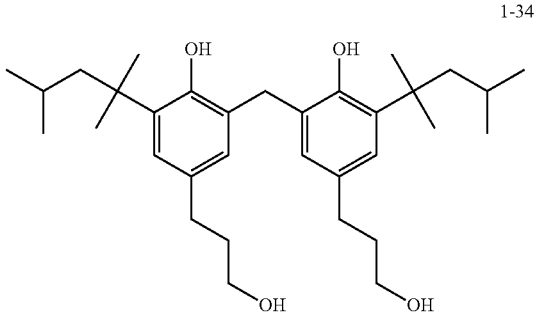
1-35
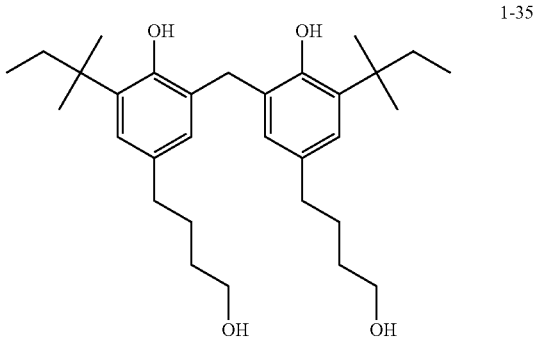
1-36
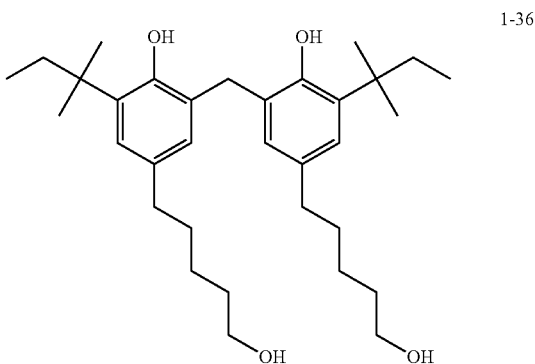

-continued
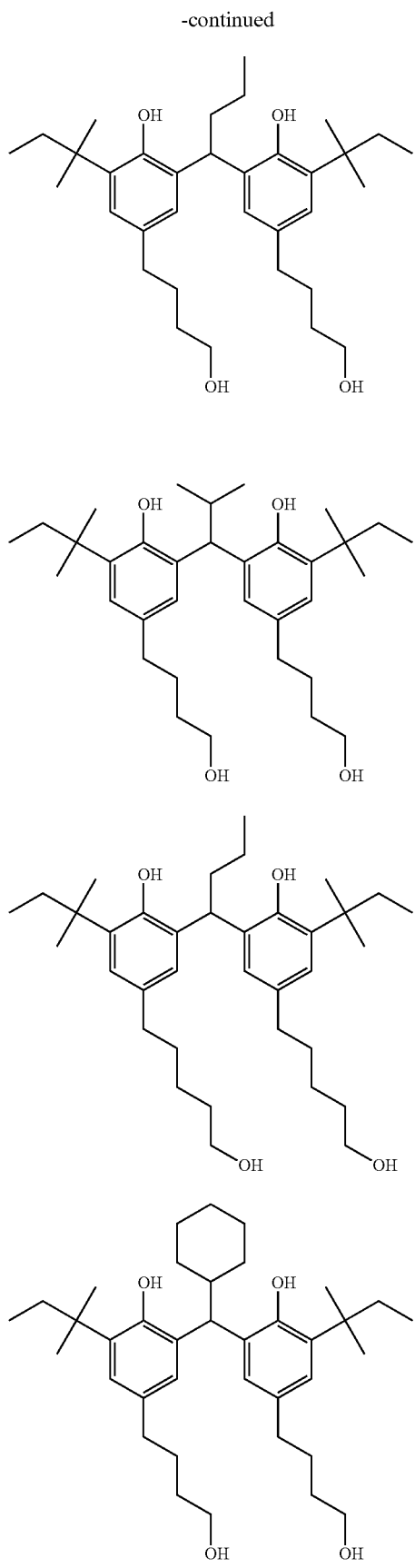
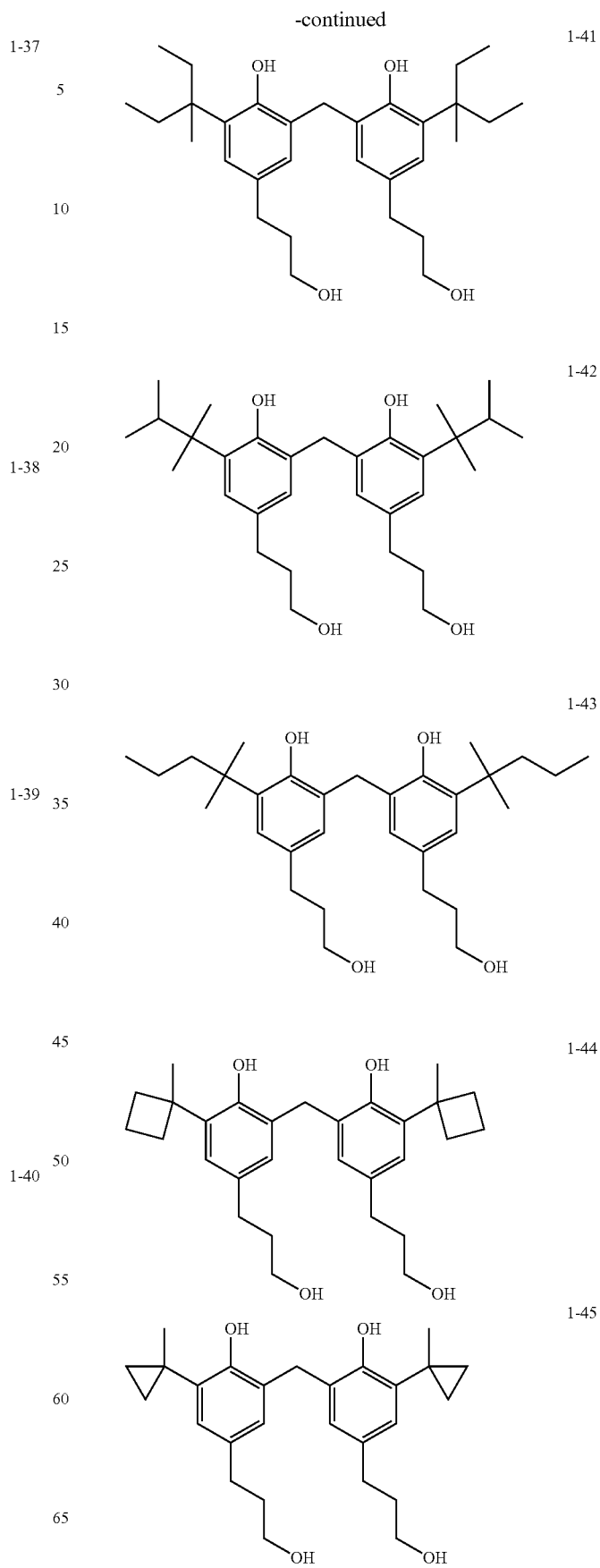

-continued
1-46
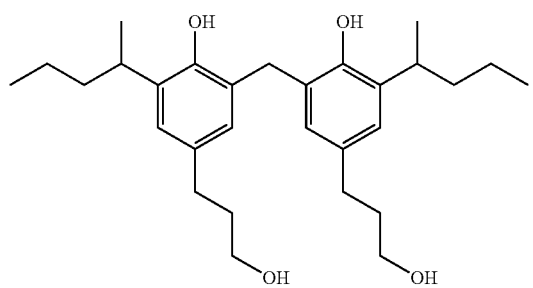
1-47
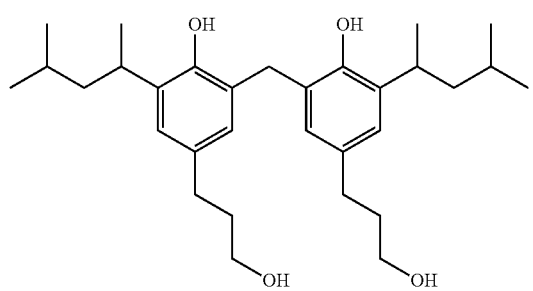
1-48
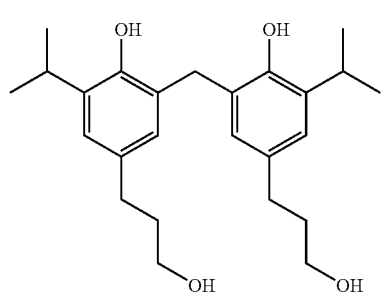
1-49
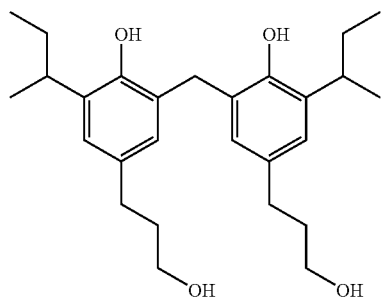
1-50
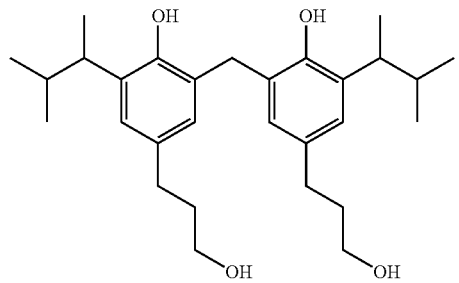
-continued
1-51
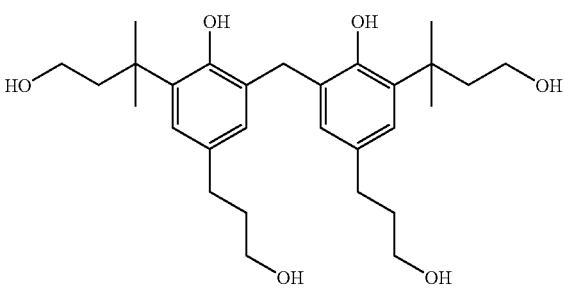
1-52
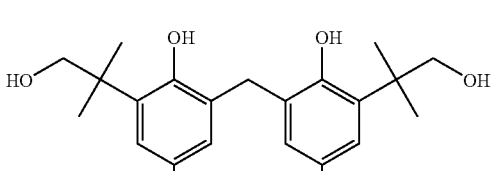
I-53
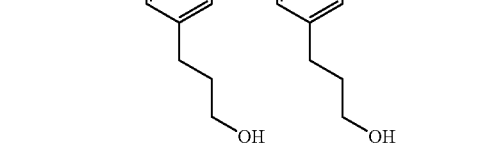
1-54
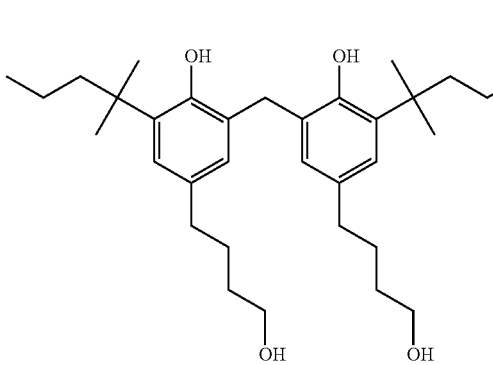

1-55
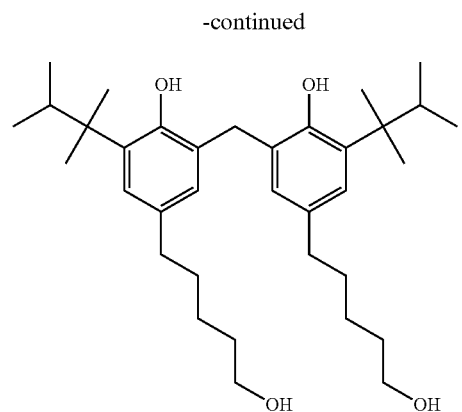
1-56
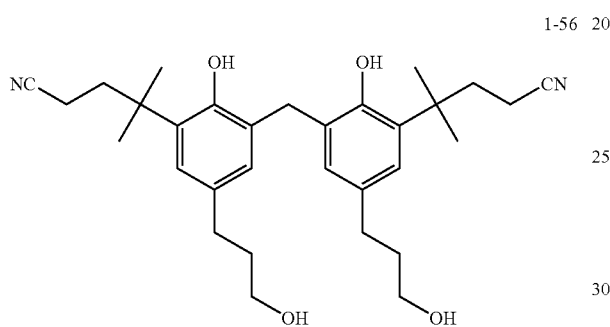
1-57
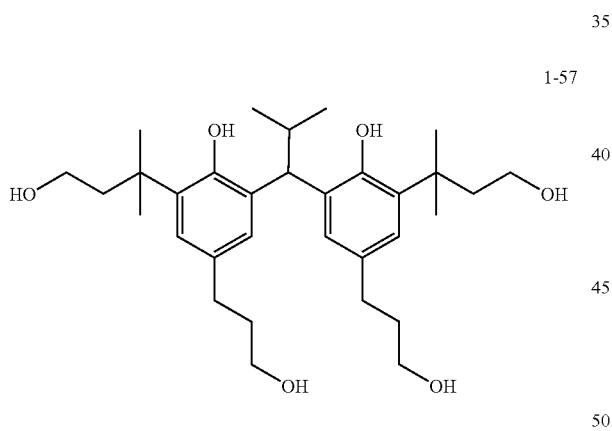
1-58
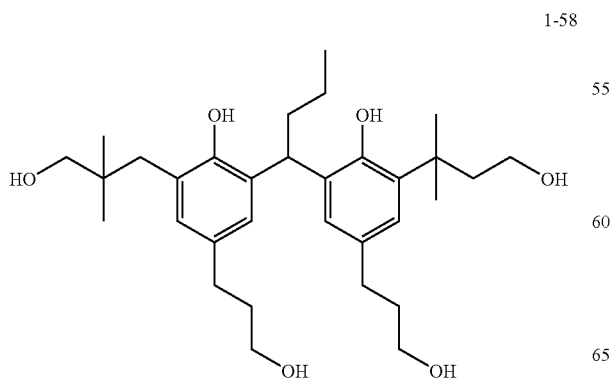
1-59
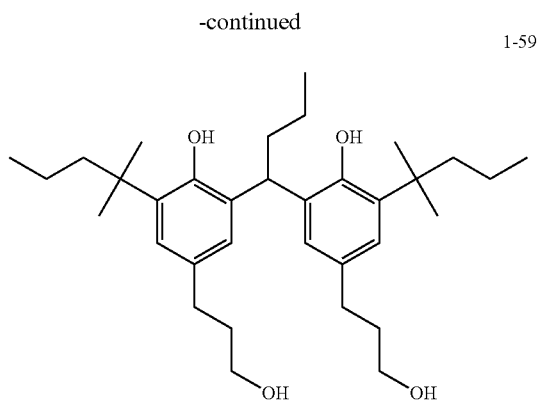
1-60
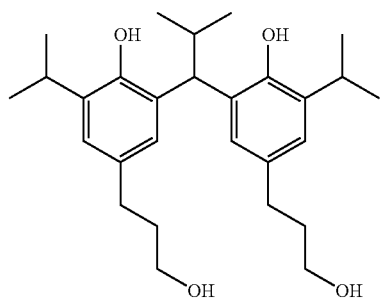
1-61
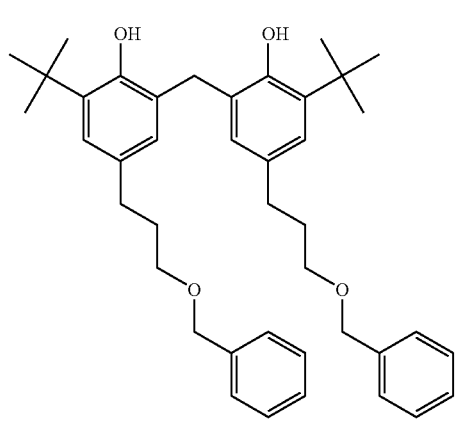
1-62
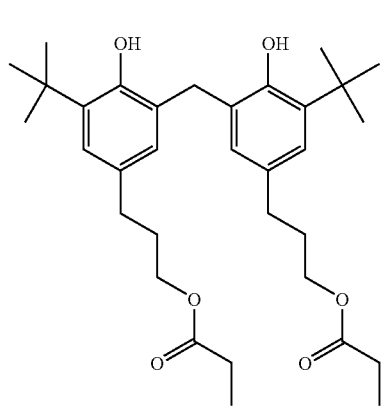

-continued
1-63
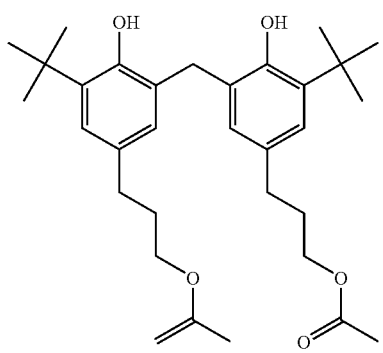
1-64
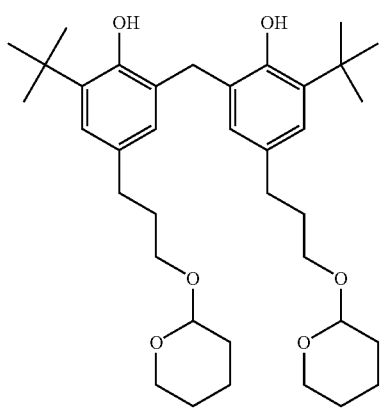
1-65
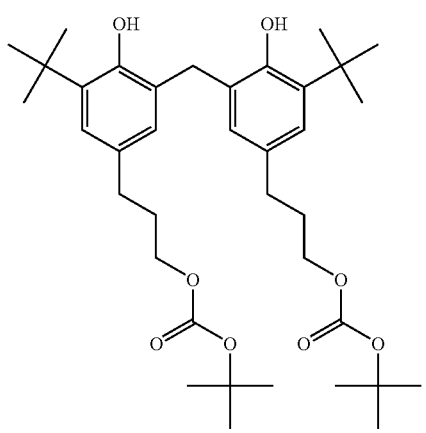
1-66
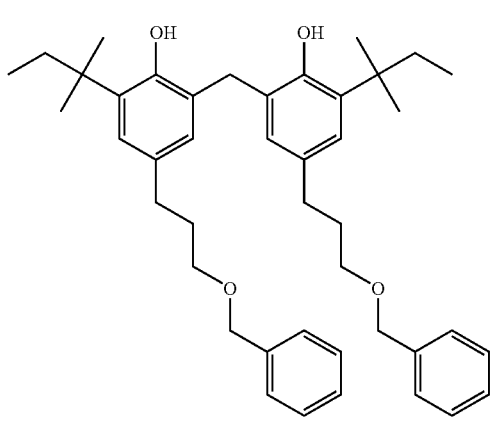
-continued
1-67
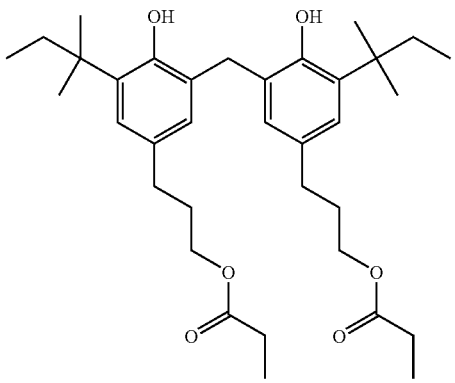
1-68
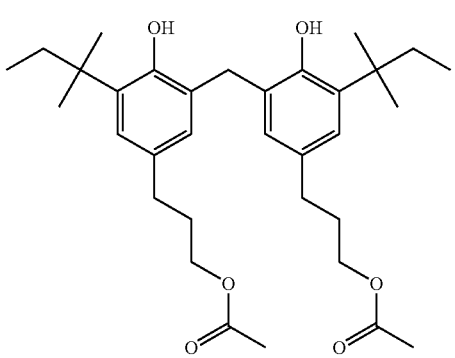
1-69
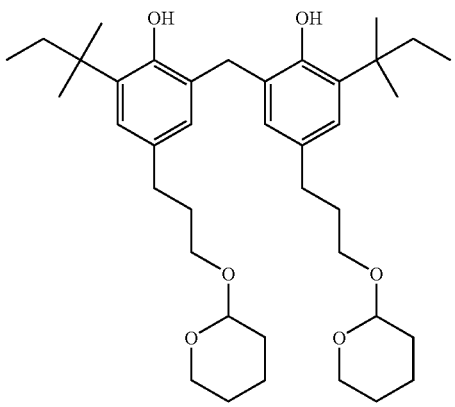
1-70
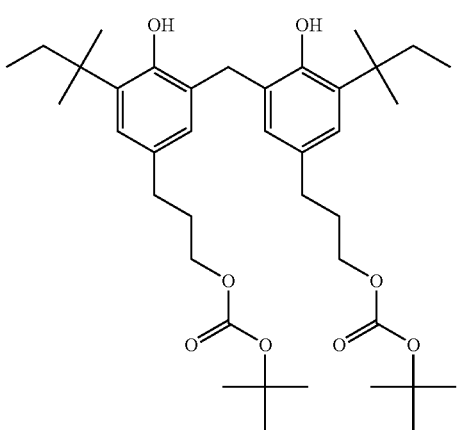

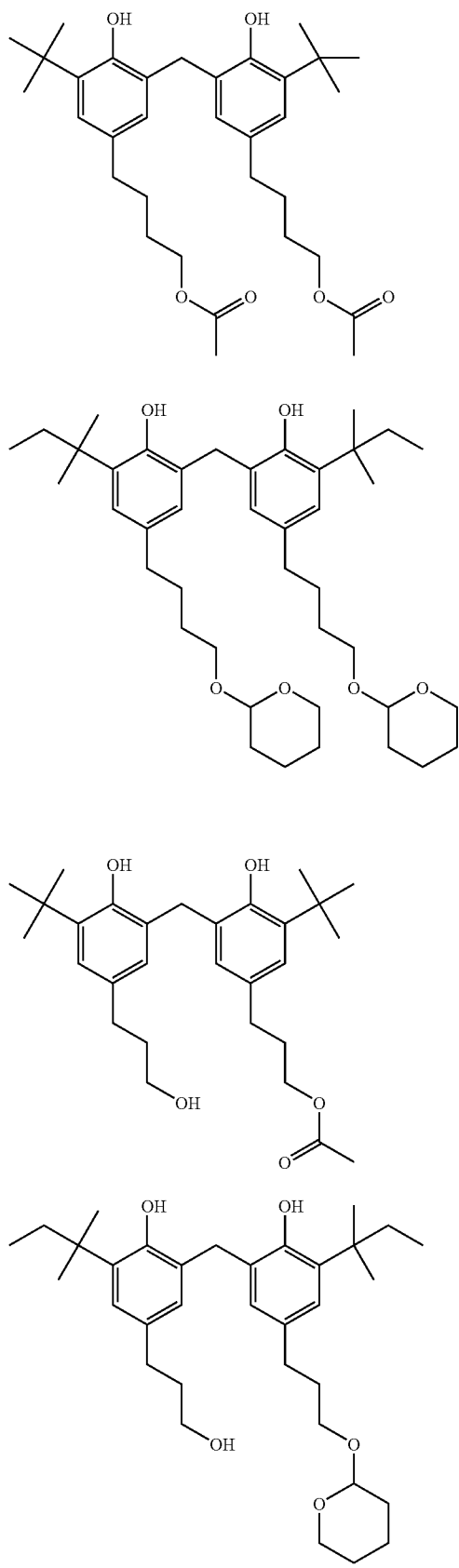

-continued
1-80
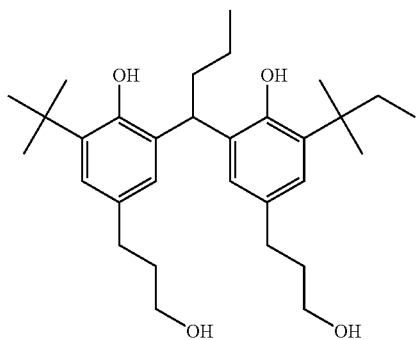
1-81
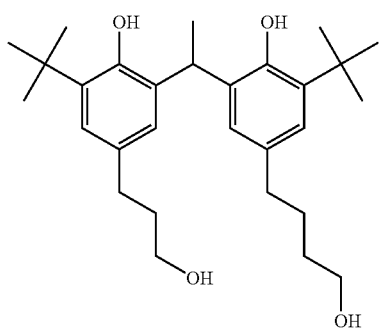
1-82
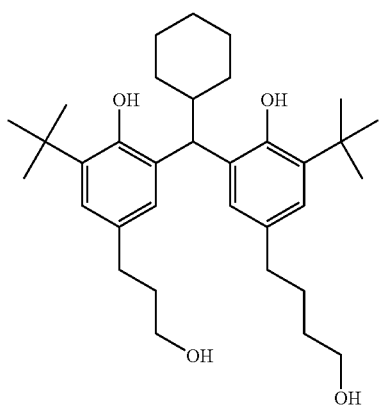
1-83
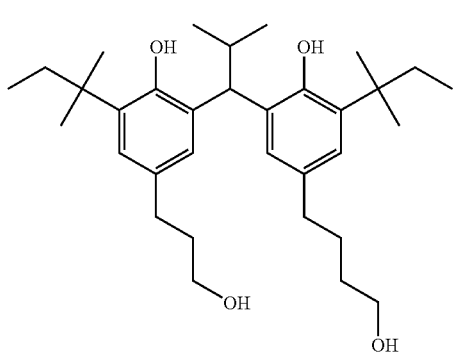
-continued
1-84
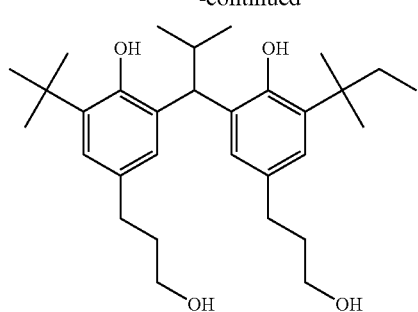
1-85
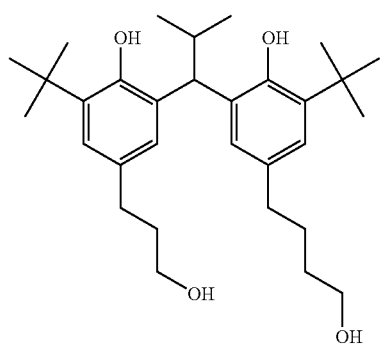
1-86
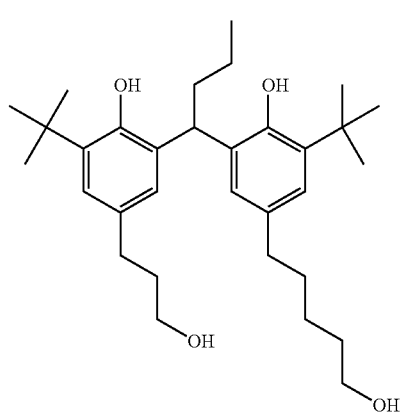
1-87
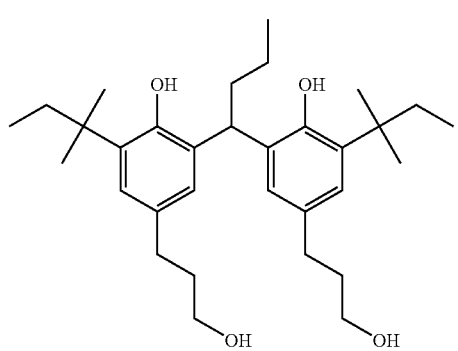

-continued
1-88
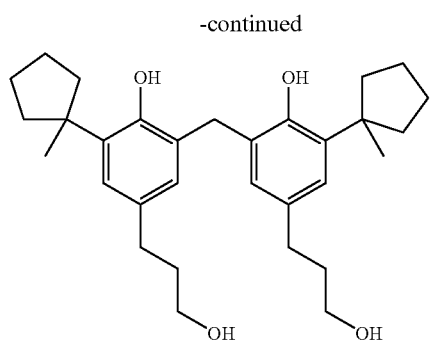
1-89
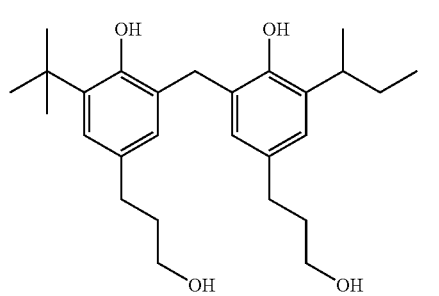
1-90
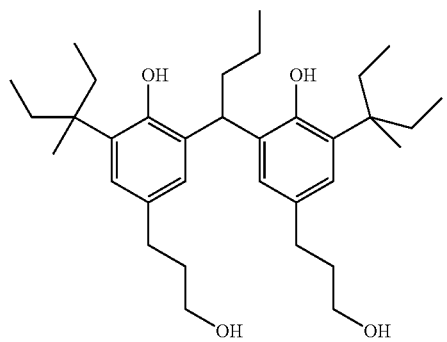
1-91
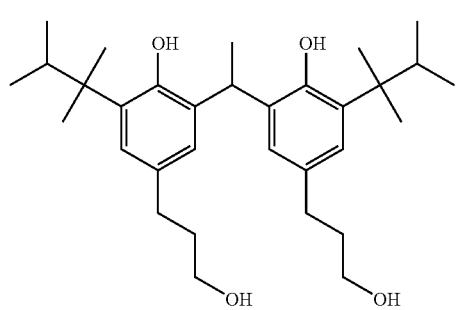
1-92
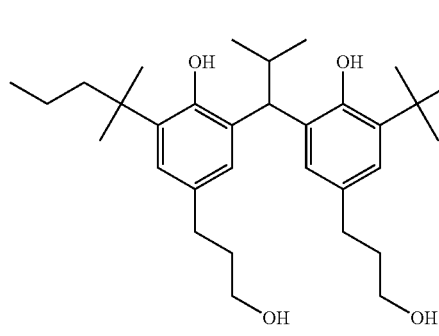
-continued
1-93
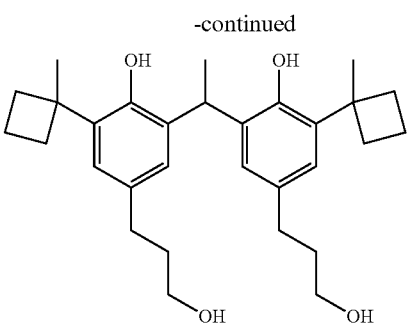
1-94
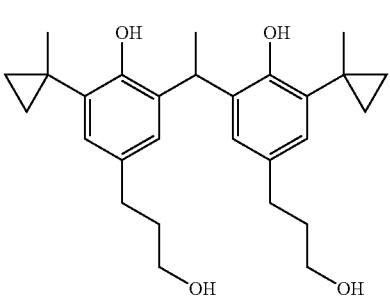
1-95
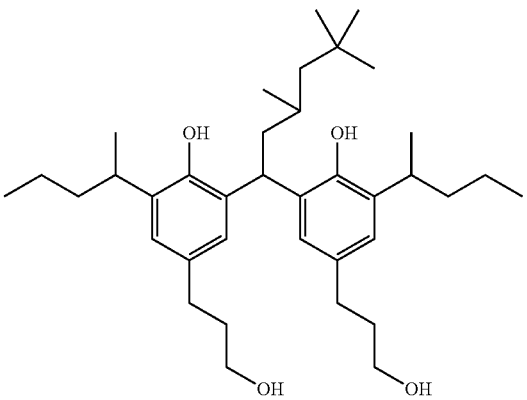
1-96
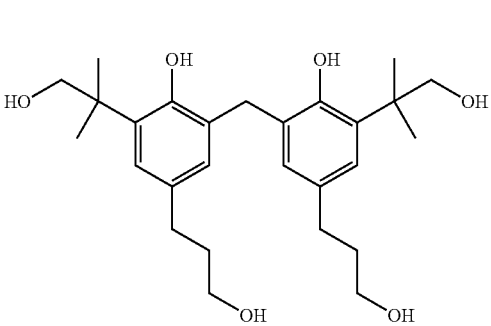

1-97

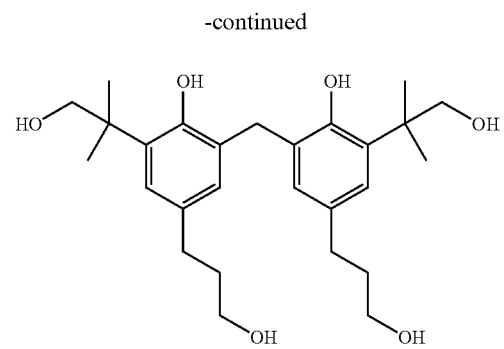

1-102

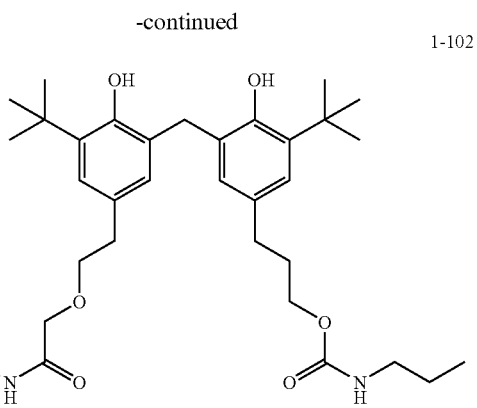

1-98

1-99

1-100

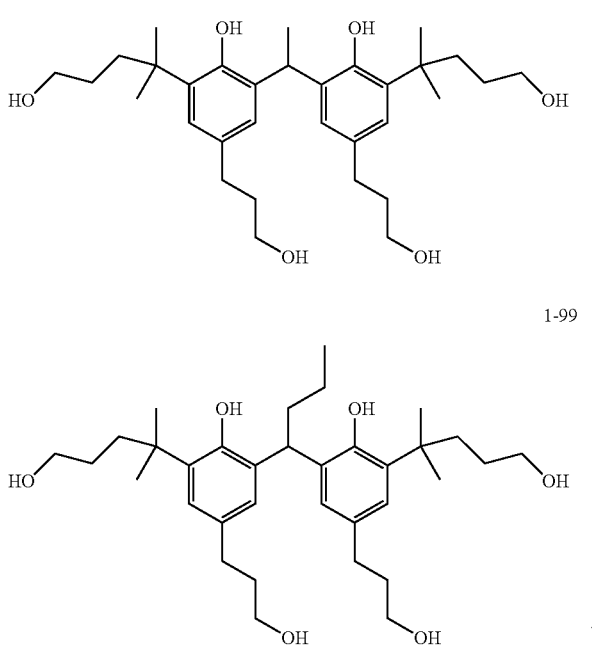

1-101

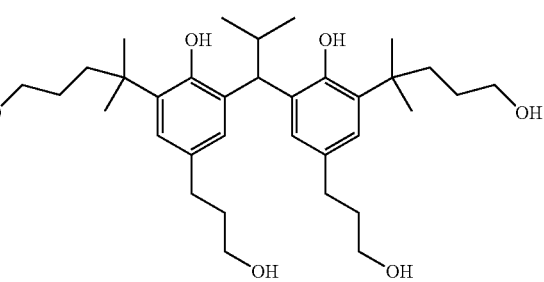

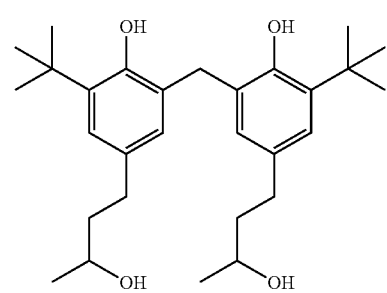

The foregoing reducing agents may be incorporated into the photothermographic material in any appropriate form, such as an emulsified dispersion or a solid particle dispersion.

Further, polyphenol compounds described in U.S. Pat. Nos. 3,589,903 and 4,021,249, British Patent No. 1,486,148, JP-A Nos. 51-51933, 50-36110, 50-116023 and 52-84727, and JP-B No. 51-35727 (hereinafter, the term JP-B refers to Japanese Patent Publication); bisnaphthols such as 2,2'-dihydroxy-1,1'-binaphthyl, described in U.S. Pat. No. 3,672,904; and sulfonamidophenol or sulfonamidonaphthol, such as 4-benzenesulfonamidophenol, 2-benzenesulfonamidophenol, 2,6-dichloro-4-benzenesulfonamidophenol and 4-benzenesulfonamidonapthol are also usable as a reducing agent.

The content of a reducing agent, depending on the kind of an organic silver salt or the reducing agent, or other additives, is generally from 0.05 to 10 mol per mol of organic silver salt, and preferably from 0.1 to 3 mol. In the invention, it is often preferred that the reducing agent is added to a light-sensitive emulsion containing light-sensitive silver halide and organic silver salt grains, immediately before coating and then coated, whereby variation in photographic performance while standing is minimized.

Binder Resin

The photothermographic material of this invention may contain a binder resin (hereinafter, also denoted as a resin) in the light-sensitive layer or the light-insensitive layer.

Binder resin contained in the light-sensitive layer bears an organic silver salt, silver halide grains, a reducing agent and other components. Suitable binders for the silver salt photothermographic material are to be transparent or translucent and commonly colorless, and include natural polymers, synthetic resin polymers and copolymers, as well as media to form film, for example, those described in paragraph [0069] of JP-A No. 2001-330918. Preferable binders for the light-sensitive layer of the photothermographic material of this invention are poly(vinyl acetals), and a particularly preferable binder is poly(vinyl butyral). Of these, for example, methacrylic acid alkyl esters, methacrylic acid aryl esters, and styrenes are preferred. Specifically, polymer compounds containing an acetal group are preferred. Of polymer compounds containing an acetal group, polyvinyl acetal having an acetoacetal structure is more preferred and examples thereof include polyvinyl acetals described in U.S. Pat. Nos. 2,358, 836, 3,003,879 and 2,828,204 and British Patent No. 771, 155.

The binder used in the light-sensitive layer is preferably polyvinyl acetals, and polyvinyl butyral is specifically preferred as a main binder. The main binder means that the foregoing polymer accounts for at least 50% by weight of the total binder of the light-sensitive layer. Accordingly, other binders may be blended at less than 50% by weight.

In the invention, a polyvinyl acetal having a polymerization degree of 700 to 3,000 is preferred as a main binder. The polymerization degree refers to that of polyvinyl alcohol which is raw material used for preparation of polyvinyl acetal. An excessively low polymerization degree of the main binder of the light-sensitive layer results in increased flow during drying or increased flowability due to heat during storage, leading to unevenness in coating and deteriorated storage stability. An excessively high polymerization degree affects solubility at the time of preparing a coating solution or solubility of raw material used for preparation of polyvinyl acetal. Accordingly, a solubility failing within the foregoing range is preferred. Other polymers may be blended within the range of less than 50% by mass of total binders of the light-sensitive layer.

Cross-linking Agent

The light-sensitive layer may contains cross-linking agents capable of binding binder molecules through cross linking. It is known that employing cross-linking agents in the aforesaid binders minimizes uneven development, due to the improved adhesion of the layer to the support. In addition, it results in such effects that fogging during storage is minimized and the creation of printout silver after development is also minimized.

There may be employed, as cross-linking agents used in this invention, various conventional cross-linking agents, which have been employed for silver halide photosensitive photographic materials, such as aldehyde type, epoxy type, ethyleneimine type, vinylsulfone type, sulfonic acid ester type, acryloyl type, carbodiimide type, and silane compound type cross-linking agents, which are described in JP-A No. 50-96216. Of these, isocyanate type compounds, silane type compounds, epoxy type compounds and acid anhydride are preferred.

Incidentally, adducts of an isocyanate with a polyalcohol are capable of markedly improving the adhesion between layers and further of markedly minimizing layer peeling, image dislocation, and air bubble formation. Such isocyanates may be incorporated in any portion of the silver salt photothermographic material. They may be incorporated in, for example, a support (particularly, when the support is paper, they may be incorporated in a sizing composition), and optional layers such as a photosensitive layer, a surface protective layer, an interlayer, an antihalation layer, and a subbing layer, all of which are placed on the photosensitive layer side of the support, and may be incorporated in at least two of the layers.

Further, as thioisocyanate based cross-linking agents usable in the present invention, compounds having a thioisocyanate structure corresponding to the isocyanates are also useful as thioisocyanate based cross-linking agents usable in the present invention.

The amount of the cross-linking agents employed in the present invention is in the range of 0.001 to 2.000 mol per mol of silver, and is preferably in the range of 0.005 to 0.500 mol.

Isocyanate compounds as well as thioisocyanate compounds, which may be incorporated in the present invention, are preferably those which function as the cross-linking agent. However, it is possible to obtain the desired results by employing compounds which have "v" of 0, namely compounds having only one functional group.

Examples of silane compounds which can be employed as a cross-linking agent in this invention are compounds represented by General formulas (1) to (3), described in JP-A No. 2001-264930.

Compounds, which can be used as a cross-linking agent, may be those having at least one epoxy group. The number of epoxy groups and corresponding molecular weight are not limited. It is preferable that the epoxy group be incorporated in the molecule as a glycidyl group via an ether bond or an imino bond. Further, the epoxy compound may be a monomer, an oligomer, or a polymer. The number of epoxy groups in the molecule is commonly from about 1 to about 10, and is preferably from 2 to 4. When the epoxy compound is a polymer, it may be either a homopolymer or a copolymer, and its number average molecular weight Mn is most preferably in the range of about 2,000 to about 20,000.

Any compound capable of reacting with a hydroxyl group or a carboxyl group is usable as a cross-linking agent used in the invention. Examples of such a compound include an acid anhydride, a oxazoline compound and a carbodiimide compound. Cross-linking agents may be used singly or in combination thereof. An addition amount is not specifically limited but preferably from $1 \times 10^{-6}$ to $1 \times 10^{-2}$ mol/$m_2$, and more preferably $1 \times 10^{-5}$ to $1 \times 10^{-3}$ mol/$m_2$. The content is preferably from 0.5 to 200 parts by mass of 100 parts by mass of a binder of the constitution layer, more preferably 2 to 100 parts by mass, and still more preferably 3 to 50 parts by mass. Compounds such as an epoxy compound or an acid anhydride may be added to any layer on the image forming layer side of the support, e.g., an image forming layer, a surface protective layer, an intermediate layer, an antihalation layer and a sublayer, and added to one or more layers of the foregoing layers. In the case when addition to the image forming layer accompanies a progress of reaction and lowering of developability, addition to a layer closer to the support at a more amount than the image forming layer can improve adhesion and unevenness in development.

Across-linking agent used in the invention may be added in the form of being previously mixed with a binder solution or at the final stage of preparing a coating solution, or added immediately before coating.

Chemical and Spectral Sensitization, Superensitization

Silver halide grains used in the invention can be subjected to chemical sensitization. In accordance with methods described in JP-A Nos. 2001-249428 and 2001-249426, for example, a chemical sensitization center (chemical sensitization speck) can be formed using compounds capable of releasing chalcogen such as sulfur or noble metal compounds capable of releasing a noble metal ion such as a gold ion. In this invention, it is preferred to conduct chemical sensitization with an organic sensitizer containing a chalcogen atom, as described below. Such a chalcogen atom-containing organic sensitizer is preferably a compound containing a group capable of being adsorbed onto silver halide and a labile chalcogen atom site. These organic sensitizers include, for example, those having various structures, as described in JP-A Nos. 60-150046, 4-109240, 11-218874, 11-218875, 11-218876 and 11-194447. Specifically preferred of these is at least a compound having a structure in which a chalcogen atom is attacked to a carbon or phosphorus atom through a double-bond. Specifically, heterocycle-containing thiourea derivatives and triphenylphosphine sulfide derivatives are preferred. A variety of techniques for chemical sensitization employed in silver halide photographic material for use in wet processing are applicable to conduct chemical sensitization, as described, for example, in T. H. James, The Theory of the Photographic Process, 4th Ed. (Macmillan Publishing Co., Ltd., 1977 and Nippon Shashin Gakai Ed., "Shashin Kogaku no Kiso (Ginene Shashin)" (Corona Co., Ltd., 1998). The amount of a chalcogen compound added as an organic sensitizer is variable, depending on the chalcogen compound to be used, silver halide grains and a reaction environment when subjected to chemical sensitization and is preferably $10^{-8}$ to $10^{-2}$ mol, and more preferably $10^{-7}$ to $10^{-3}$ mol per mol of silver halide. In the invention, the chemical sensitization environment is not specifically limited but it is preferred to conduct chemical sensitization in the presence of a compound capable of eliminating a silver chalcogenide or silver specks formed on the silver halide grain or reducing the size thereof, or specifically in the presence of an oxidizing agent capable of oxidizing the silver specks, using a chalcogen atom-containing organic sensitizer. To conduct chemical sensitization under preferred conditions, the pAg is preferably 6 to 11, and more preferably 7 to 10, the pH is preferably 4 to 10 and more preferably 5 to 8, and the temperature is preferably not more than 30° C.

Chemical sensitization using the foregoing organic sensitizer is also preferably conducted in the presence of a spectral sensitizing dye or a heteroatom-containing compound capable of being adsorbed onto silver halide grains. Thus, chemical sensitization in the present of such a silver halide-adsorptive compound results in prevention of dispersion of chemical sensitization center specks, thereby achieving enhanced sensitivity and minimized fogging. Although there will be described spectral sensitizing dyes used in the invention, preferred examples of the silver halide-adsorptive, heteroatom-containing compound include nitrogen containing heterocyclic compounds described in JP-A No. 3-24537. In the heteroatom-containing compound, examples of the heterocyclic ring include a pyrazolo ring, pyrimidine ring, 1,2,4-triazole ring, 1,2,3-triazole ring, 1,3,4-thiazole ring, 1,2,3-thiadiazole ring, 1,2,4-thiadiazole ring, 1,2,5-thiadiazole ring, 1,2,3,4-tetrazole ring, pyridazine ring, 1,2,3-triazine ring, and a condensed ring of two or three of these rings, such as triazolotriazole ring, diazaindene ring, triazaindene ring and pentazaindene ring. Condensed heterocyclic ring comprised of a monocyclic hetero-ring and an aromatic ring include, for example, a phthalazine ring, benzimidazole ring indazole ring, and benzthiazole ring. Of these, an azaindene ring is preferred and hydroxy-substituted azaindene compounds, such as hydroxytriazaindene, tetrahydroxyazaindene and hydroxypentazaundene compound are more preferred. The heterocyclic ring may be substituted by substituent groups other than hydroxy group. Examples of the substituent group include an alkyl group, substituted alkyl group, alkylthio group, amino group, hydroxyamino group, alkylamino group, dialkylamino group, arylamino group, carboxy group, alkoxycarbonyl group, halogen atom and cyano group. The amount of the heterocyclic ring containing compound to be added, which is broadly variable with the size or composition of silver halide grains, is within the range of $10^{-6}$ to 1 mol, and preferably $10^{-4}$ to $10^{-1}$ mol per mol silver halide.

As described earlier, silver halide grains can be subjected to noble metal sensitization using compounds capable of releasing noble metal ions such as a gold ion. Examples of usable gold sensitizers include chloroaurates and organic gold compounds. In addition to the foregoing sensitization, reduction sensitization can also be employed and exemplary compounds for reduction sensitization include ascorbic acid, thiourea dioxide, stannous chloride, hydrazine derivatives, borane compounds, silane compounds and polyamine compounds. Reduction sensitization can also conducted by ripening the emulsion while maintaining the pH at not less than 7 or the pAg at not more than 8.3. Silver halide to be subjected to chemical sensitization may be one which has been prepared in the presence of an organic silver salt, one which has been formed under the condition in the absence of the organic silver salt, or a mixture thereof.

When the surface of silver halide grains is subjected to chemical sensitization, it is preferred that an effect of the chemical sensitization substantially disappears after subjected to thermal development. An effect of chemical sensitization substantially disappearing means that the sensitivity of the photothermographic material, obtained by the foregoing chemical sensitization is reduced, after thermal development, to not more than 1.1 times that of the case not having been subjected to chemical sensitization. To allow the effect of chemical sensitization to disappear, it is preferred to allow an oxidizing agent such as a halogen radical-releasing compound which is capable of decomposing a chemical sensitization center (or chemical sensitization nucleus) through an oxidation reaction to be contained in an optimum amount in the light-sensitive layer and/or the light-insensitive layer. The content of an oxidizing agent is adjusted in light of oxidizing strength of an oxidizing agent and chemical sensitization effects.

The light-sensitive silver halide usable in this invention is preferably spectrally sensitized by adsorption of spectral sensitizing dyes. Examples of the spectral sensitizing dye include cyanine, merocyanine, complex cyanine, complex merocyanine, holo-polar cyanine, styryl, hemicyanine, oxonol and hemioxonol dyes, as described in JP-A Nos. 63-159841, 60-140335, 63-231437, 63-259651, 63-304242, 63-15245; U.S. Pat. Nos. 4,639,414, 4,740,455, 4,741,966, 4,751,175 and 4,835,096. Usable sensitizing dyes are also described in Research Disclosure (hereinafter, also denoted as RD) 17643, page 23, sect. IV-A (December, 1978), and ibid 18431, page 437, sect. X (August, 1978). It is preferred to use sensitizing dyes exhibiting spectral sensitivity suitable for spectral characteristics of light sources of various laser imagers or scanners. Examples thereof include compounds described in JP-A Nos. 9-34078, 9-54409 and 9-80679.

Useful cyanine dyes include, for example, cyanine dyes containing a basic nucleus, such as thiazoline, oxazoline, pyrroline, pyridine, oxazole, thiazole, selenazole and imidazole nuclei. Useful merocyanine dyes preferably contain, in addition to the foregoing nucleus, an acidic nucleus such as thiohydantoin, rhodanine, oxazolidine-dione, thiazoline-dione, barbituric acid, thiazolinone, malononitrile and pyrazolone nuclei. In the invention, there are also preferably used sensitizing dyes having spectral sensitivity within the infrared region. Examples of the preferred infrared sensitizing dye include those described in U.S. Pat. Nos. 4,536,478, 4,515,888 and 4,959,294.

The photothermographic material preferably contains at least one of sensitizing dyes described in Japanese Patent Application No. 2003-102726, represented by the following formulas (SD-1) and (SD-2):

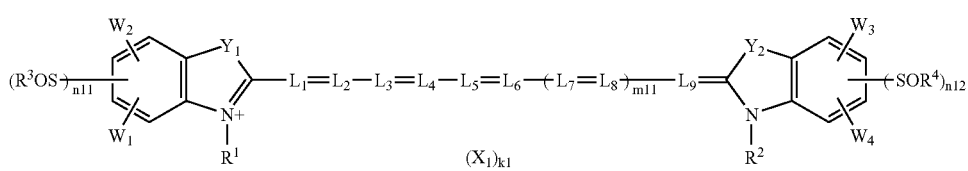

formula (SD1)

formula (SD2)

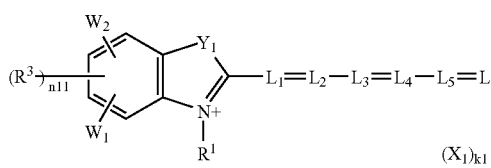 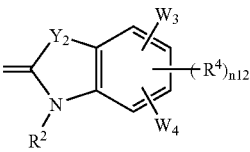

wherein $Y_1$ and $Y_2$ are each an oxygen atom, a sulfur atom, a selenium atom or —CH=CH—; $L_1$ to $L_9$ are each a methine group; $R_1$ and $R_2$ are an aliphatic group; $R^3$ and $R^4$ are each a lower alkyl group, a cycloalkyl group, an alkenyl group, an aralkyl group, an aryl group or a heterocyclic group; $W_1$, $W_2$, $W_3$ and $W_4$ are each a hydrogen atom, a substituent or an atom group necessary to form a ring by $W_1$ and $W_2$ or $W_3$ and $W_4$, or an atom group necessary to form a 5- or 6-membered ring by $R^3$ and $W_1$, $R^3$ and $W_2$, $R^4$ and $W_3$, $R^4$ and $W_4$; $X_1$ is an ion necessary to compensating for a charge within the molecule; k1 is the number of ions necessary to compensate for a charge within the molecule; m11 is 0 or 1; n11 and n12 are each 0, 1 or 2, provided that n11 and n12 are not 0 at the same time.

The infrared sensitizing dyes and spectral sensitizing dyes described above can be readily synthesized according to the methods described in F. M. Hammer, The Chemistry of Heterocyclic Compounds vol. 18, "The cyanine Dyes and Related Compounds" (A. Weissberger ed. Interscience Corp., New York, 1964).

The infrared sensitizing dyes can be added at any time after preparation of silver halide. For example, the dye can be added to a light sensitive emulsion containing silver halide grains/organic silver salt grains in the form of by dissolution in a solvent or in the form of a fine particle dispersion, so-called solid particle dispersion. Similarly to the heteroatom-containing compound having adsorptivity to silver halide, after adding the dye prior to chemical sensitization and allowing it to be adsorbed onto silver halide grains, chemical sensitization is conducted, thereby preventing dispersion of chemical sensitization center specks and achieving enhanced sensitivity and minimized fogging.

These sensitizing dyes may be used alone or in combination thereof. The combined use of sensitizing dyes is often employed for the purpose of supersensitization, expansion or adjustment of the light-sensitive wavelength region. A super-sensitizing compound, such as a dye which does not exhibit spectral sensitization or substance which does not substantially absorb visible light may be incorporated, in combination with a sensitizing dye, into the emulsion containing silver halide grains and organic silver salt grains used in photothermographic imaging materials of the invention.

Useful sensitizing dyes, dye combinations exhibiting super-sensitization and materials exhibiting supersensitization are described in RD17643 (published in December, 1978), IV-J at page 23, JP-B 9-25500 and 43-4933 (herein, the term, JP-B means published Japanese Patent) and JP-A 59-19032, 59-192242 and 5-341432. In the invention, an aromatic heterocyclic mercapto compound represented by the following formula is preferred as a supersensitizer:

Ar—SM wherein M is a hydrogen atom or an alkali metal atom; Ar is an aromatic ring or condensed aromatic ring containing a nitrogen atom, oxygen atom, sulfur atom, selenium atom or tellurium atom. Such aromatic heterocyclic rings are preferably benzimidazole, naphthoimidazole, benzthiazole, naphthothiazole, benzoxazole, naphthooxazole, benzoselenazole, benzotellurazole, imidazole, oxazole, pyrazole, triazole, triazines, pyrimidine, pyridazine, pyrazine, pyridine, purine, and quinoline. Other aromatic heterocyclic rings may also be included.

A disulfide compound which is capable of forming a mercapto compound when incorporated into a dispersion of an organic silver salt and/or a silver halide grain emulsion is also included in the invention. In particular, a preferred example thereof is a disulfide compound represented by the following formula:

Ar—S—S—Ar wherein Ar is the same as defined in the mercapto compound represented by the formula described earlier.

The aromatic heterocyclic rings described above may be substituted with a halogen atom (e.g., Cl, Br, I), a hydroxy group, an amino group, a carboxy group, an alkyl group (having one or more carbon atoms, and preferably 1 to 4 carbon atoms) or an alkoxy group (having one or more carbon atoms, and preferably 1 to 4 carbon atoms). In addition to the foregoing supersensitizers, there are usable heteroatom-containing macrocyclic compounds described in JP-A No. 2001-330918, as a supersensitizer. The supersensitizer is incorporated into a light-sensitive layer containing organic silver salt and silver halide grains, preferably in an amount of 0.001 to 1.0 mol, and more preferably 0.01 to 0.5 mol per mol of silver.

It is preferred that a sensitizing dye is allowed to adsorb onto the surface of light-sensitive silver halide grains to achieve spectral sensitization and the spectral sensitization effect substantially disappears after being subjected to thermal development. The effect of spectral sensitization substantially disappearing means that the sensitivity of the photothermographic material, obtained by a sensitizing dye or a supersensitizer is reduced, after thermal development, to not more than 1.1 times that of the case not having been subjected to spectral sensitization. To allow the effect of spectral sensitization to disappear, it is preferred to use a spectral sensitizing dye easily releasable from silver halide grains and/or to allow an oxidizing agent such as a halogen radical-releasing compound which is capable of decomposing a spectral sensitizing dye through an oxidation reaction to be contained in an optimum amount in the light-sensitive layer and/or the light-insensitive layer. The content of an oxidizing agent is adjusted in light of oxidizing strength of the oxidizing agent and its spectral sensitization effects.

Image Color Tone

The color tone of images obtained by thermal development of the imaging material is described.

It has been pointed out that in regard to the output image tone for medical diagnosis, cold image tone tends to result in more accurate diagnostic observation of radiographs. The cold image tone, as described herein, refers to pure black tone or blue black tone in which black images are tinted to blue. On the other hand, warm image tone refers to warm black tone in which black images are tinted to brown.

The tone is more described below based on an expression defined by a method recommended by the Commission Internationale de l'Eclairage (CIE) in order to define more quantitatively.

"Colder tone" as well as "warmer tone", which is terminology of image tone, is expressed, employing minimum density $D_{min}$ and hue angle $h_{ab}$ at an optical density D of 1.0. The hue angle $h_{ab}$ is obtained by the following formula, utilizing color specifications a* and b* of L*a*b* Color Space which is a color space perceptively having approximately a uniform rate, recommended by Commission Internationale de l'Eclairage (CIE) in 1976.

$$h_{ab}=\tan^{-1}(b^*/a^*)$$

In this invention, $h_{ab}$ is preferably in the range of 180 degrees<$h_{ab}$<270 degrees, is more preferably in the range of 200 degrees<$h_{ab}$<270 degrees, and is most preferably in the range of 220 degrees<$h_{ab}$<260 degrees.

This finding is also disclosed in JP-A 2002-6463.

Incidentally, as described, for example, in JP-A No. 2000-29164, it is conventionally known that diagnostic images with visually preferred color tone are obtained by adjusting, to the specified values, u* and v* or a* and b* in CIE 1976 (L*u*v*) color space or (L*a*b*) color space near an optical density of 1.0.

Extensive investigation was performed for the silver salt photothermographic material according to the present invention. As a result, it was discovered that when a linear regression line was formed on a graph in which in the CIE 1976 (L*u*v*) color space or the (L*a*b*) color space, u* or a* was used as the abscissa and v* or b* was used as the ordinate, the aforesaid materiel exhibited diagnostic properties which were equal to or better than conventional wet type silver salt photosensitive materials by regulating the resulting linear regression line to the specified range. The condition ranges of the present invention will now be described.

(1) It is preferable that the coefficient of determination value $R^2$ of the linear regression line, which is made by arranging u* and v* in terms of each of the optical densities of 0.5, 1.0, and 1.5 and the minimum optical density, is also from 0.998 to 1.000.

The value v* of the intersection point of the aforesaid linear regression line with the ordinate is −5−+5; and gradient (v*/u*) is 0.7 to 2.5.

(2) The coefficient of determination value $R^2$ of the linear regression line is 0.998 to 1.000, which is formed in such a manner that each of optical density of 0.5, 1.0, and 1.5 and the minimum optical density of the aforesaid imaging material is measured, and a* and b* in terms of each of the above optical densities are arranged in two-dimensional coordinates in which a* is used as the abscissa of the CIE 1976 (L*a*b*) color space, while b* is used as the ordinate of the same. In addition, value b* of the intersection point of the aforesaid linear regression line with the ordinate is from −5 to +5, while gradient (b*/a*) is from 0.7 to 2.5.

A method for making the above-mentioned linear regression line, namely one example of a method for determining u* and v* as well as a* and b* in the CIE 1976 color space, will now be described.

By employing a thermal development apparatus, a 4-step wedge sample including an unexposed portion and optical densities of 0.5, 1.0, and 1.5 is prepared. Each of the wedge density portions prepared as above is determined employing a spectral chronometer (for example, CM-3600d, manufactured by Minolta Co., Ltd.) and either u* and v* or a* and b* are calculated. Measurement conditions are such that an F7 light source is used as a light source, the visual field angle is 10 degrees, and the transmission measurement mode is used. Subsequently, either measured u* and v* or measured a* and b* are plotted on the graph in which u* or a* is used as the abscissa, while v* or b* is used as the ordinate, and a linear regression line is formed, whereby the coefficient of determination value $R^2$ as well as intersection points and gradients are determined.

The specific method enabling to obtain a linear regression line having the above-described characteristics will be described below. In this invention, by regulating the added amount of the developing agents, silver halide grains, and aliphatic carboxylic acid silver, which are directly or indirectly involved in the development reaction process, it is possible to optimize the shape of developed silver so as to result in the desired tone. For example, when the developed silver is shaped to dendrite, the resulting image tends to be bluish, while when shaped to filament, the resulting imager tends to be yellowish. Namely, it is possible to adjust the image tone taking into account the properties of shape of developed silver.

Usually, image toning agents such as phthalazinone or a combinations of phthalazine with phthalic acids, or phthalic anhydride are employed. Examples of suitable image toning agents are disclosed in Research Disclosure, Item 17029, and U.S. Pat. Nos. 4,123,282, 3,994,732, 3,846,136, and 4,021,249.

Specific examples include imides (e.g. succinimide, phthalimide, naphthalimide, N-hydroxy-1,8-naphthalimide), mercaptans (e.g., 3-mercapto-1,24-triazole), phthalazinone derivatives and their metal salts (e.g., phthalazinone, 4-(1-naphthyl)phthalazinone, 6-chlorophthalazinone, 5,7-dimethyloxyphthalazinone, 2,3-dihydroxyl,4-phthalazine-dione), combination of phthalazine and phthalic acids (e.g., phthalic acid, 4-methylphthalic acid, 4-nitrophthalic acid, tetrachlorophthalic acid); combination of phthalazine and a compound selected from maleic acid anhydride, phthalic acid, 2.3-naphthalenedicarboxylic acid and o-phenylene acid derivatives and their anhydrides (e.g., phthalic acid, 4-methylpthalic acid, 4-nitrophthalic acid, tetrachlorophthalic acid anhydride). Of these, a specifically preferred image toning agent is a combination of phthalazinone or phthalazine, and phthalic acids or phthalic acid anhydrides.

It is specifically preferred to contain both compounds to achieve superior image tone. Thus, it is preferable to control color tone employing couplers disclosed in JP-A No. 11-288057 and EP 1134611A2 as well as leuco dyes detailed below.

The photothermographic material relating to this invention can employ leuco dyes to control image tone, as described above. Leuco dyes are employed in the silver salt photothermographic materials relating to this invention. There may be employed, as leuco dyes, any of the colorless or slightly tinted compounds which are oxidized to form a colored state when heated at temperatures of about 80 to about 200° C. for about 0.5 to about 30 seconds. It is possible to use any of the leuco dyes which are oxidized by silver ions to form dyes. Compounds are useful which are sensitive to pH and are oxidizable to a colored state.

Representative leuco dyes suitable for the use in the present invention are not particularly limited. Examples include bisphenol leuco dyes, phenol leuco dyes, indoaniline leuco dyes, acrylated azine leuco dyes, phenoxazine leuco dyes, phenodiazine leuco dyes, and phenothiazine leuco dyes. Further, other useful leuco dyes are those disclosed in U.S. Pat. Nos. 3,445,234, 3,846,136, 3,994,732, 4,021,249, 4,021,250, 4,022,617, 4,123,282, 4,368,247, and 4,461,681, as well as JP-A Nos. 50-36110, 59-206831, 5-204087, 11-231460, 2002-169249, and 2002-236334.

In order to control images to specified color tones, it is preferable that various color leuco dyes are employed individually or in combinations of a plurality of types. In the present invention, for minimizing excessive yellowish color tone due to the use of highly active reducing agents, as well as excessive reddish images especially at a density of at least 2.0 due to the use of minute silver halide grains, it is preferable to employ leuco dyes which change to cyan. Further, in order to achieve precise adjustment of color tone, it is further preferable to simultaneously use yellow leuco dyes and other leuco dyes which change to cyan.

It is preferable to appropriately control the density of the resulting color while taking into account the relationship with the color tone of developed silver itself. In this invention, dye formation is performed so as to have a reflection density of 0.01 to 0.05 or a transmission density of 0.005 to 0.50, and the image tone is adjusted so as to form images exhibiting tone failing within the foregoing tone range. In the present invention, color formation is performed so that the sum of maximum densities at the maximum adsorption wavelengths of dye images formed by leuco dyes is customarily 0.01 to 0.50, is preferably 0.02 to 0.30, and is most preferably 0.03 to 0.10. Further, it is preferable that images be controlled within the preferred color tone range described below.

A leuco dye is incorporated usually in an amount of 0.00001 to 0.01 mol per mol of silver, preferably 0.0005 to 0.01 mol, and more preferably 0.001 to 0.008 mol. The molar ratio of yellow dye forming leuco dye to total amount of reducing agents is preferably from 0.001 to 0.2 and more preferably from 0.005 to 0.1.

A reducing agent of the foregoing formula (1) or a cyan dye forming leuco dye is incorporated preferably to a light-sensitive layer containing an aliphatic carboxylic acid silver salt, one of them is incorporated to the light-sensitive layer and the other one is incorporated a light-insensitive layer adjacent to the light-sensitive layer, or both may be incorporated to the light-insensitive layer.

Antifoggant and Image Stabilizer

Any component layer of the photothermographic material of this invention preferably contains an antifoggant to inhibit fogging caused before being thermally developed and an image stabilizer to prevent deterioration of images after being thermally developed.

Next, there will be described an antifoggant and an image stabilizer usable in the photothermographic material of this invention.

Since bisphenols and sulfonamidophenols which contain a proton are mainly employed as a reducing agent, incorporation of a compound which generates reactive species capable of abstracting hydrogen is preferred to deactivate the reducing agent. It is also preferred to include a compound capable of oxidizing silver atoms or metallic silver (silver cluster) generated during storage of raw film or images. Specific examples of a compound exhibiting such a function include biimidazolyl compounds and iodonium compounds, as described in JP-A No. 2003-270755, paragraph [0096]-[0128]. Further, compounds capable of releasing a halogen atom as a active specie. Examples of such compounds include a polymer comprised of at least a repeating unit of a monomer having a halogen radical releasing group, as described in JP-A 2003-91054; vinylsulfones and/or β-halosulfones, as described JP-A No. 6-208192; vinyl type inhibitors containing an electron-withdrawing group, as described in Japanese Patent Application publication No. 2004-234206.

In cases when a reducing agent used in this invention is a compound containing an aromatic hydroxyl group (OH), specifically bisphenols, it is preferred to use a non-reducible compound capable of forming a hydrogen bond with such a group, for example, compounds (II-1) to (II-40) described in JP-A No. 2002-90937, paragraph [0061]-[064].

A number of compounds capable of generating a halogen atom as reactive species are knows as an antifoggant or an image stabilizer. Specific examples of a compound generating an active halogen atom include compounds of formula (9) described in JP-A No. 2002-287299, paragraph [0264]-[0271]. These compounds are incorporated preferably at an amount within the range of an increase of printed-out silver formed of silver halide being ignorable. Thus, the ratio to a compound forming no active halogen radical is preferably at most 150%, more preferably at most 100%. Specific examples of a compound generating active halogen atom include compounds (III-1) to (III-23) described in paragraph [0086]-[0087] of JP-A NO. 2002-169249; compounds 1-1a to 1-1o, and 1-2a to 1-2o described in paragraph [0031] to [0034] and compounds 2a to 2z, 2aa to 2ll and 2-1a to 2-if described in paragraph [0050]-[0056] of JP-A No. 2003-50441; and compound 4-1 to 4-32 described in paragraph [0055] to [0058] and compounds 5-1 to 5-10 described in paragraph [0069] to [0072] of JP-A No. 2003-91054.

Examples of preferred antifoggants usable in this invention include compounds a to j described in [0012] of JP-A No. 8-314059, thiosulfonate esters A to K described in [0028] of JP-A No. 7-209797, compounds (1) to (44) described on page 14 of JP-A No. 55-140833, compounds (I-1) to (I-6) described in [0063] and compounds (C-1) to (C-3) described in [0066] of JP-A No. 2001-13627, compounds (III-1) to) III-108) described in [0027] of JP-A No. 2002-90937, vinylsulfone and/or β-halosulfone compounds VS-1 to VS-7 and HS-1 to HS-5 described in [0013] of JP-A No. 6-208192, sulfonylbenzotriazole compounds KS-1 to KS-8 described in JP-A No. 200-330235, substituted propenenitrile compounds PR-01 to PR-08 described in JP-A No. 2000-515995 (published Japanese translation of PCT international publication for patent application) and compounds (1)-1 to (1)-132 described in [0042] to [0051] of JP-A No. 2002-207273. The foregoing antifoggant is used usually in an amount of at least 0.001 mol per mol of silver, preferably from 0.01 to 5 mol, and more preferably from 0.02 to 0.6 mol.

Compounds commonly known as other than the foregoing compounds may be contained in the photothermographic material of this invention, which may be a compound capable of forming a reactive species or a compound exhibiting a different mechanism of antifogging. Examples of such compounds include those described in U.S. Pat. Nos. 3,589,903, 4,546,075 and 4,452,885; JP-A No. 59-57234; U.S. Pat. Nos. 3,874,946 and 4,756,999; JP-A No. 59-57234, 9-188328 and 9-90550. Further, other antifoggants include, for example, compounds described in U.S. Pat. No. 5,028,523 and European Patent Nos. 600,587, 605,981 and 631,176.

Surface Controlling Agent

Photothermographic material is often subject to undesirable effects caused by the photothermographic material being brought into contact with various devices at the time of wind-up, rewind or transport of the photothermographic material in the manufacturing process, such as coating, drying or converting. Such are scratch or a slippage mark on the photothermographic material surface or deteriorated transportability in a development apparatus.

To prevent flaws on the surface or deteriorated transportability, a lubricant or a matting agent may be incorporated to any one of constituent layers of the photothermographic material of the invention, specifically an uppermost layer on the support to control physical properties of the surface.

The photothermographic material preferably contains organic solid lubricant particles having an average particle size of 1 to 30 μm in the uppermost layer on the support. The organic solid lubricant particles are dispersed preferably by a polymeric dispersing agent. The melting point of the organic solid lubricant particles preferably is higher than the thermal development temperature and preferably 80° C. or more, more preferably 110° C. or more.

The organic solid lubricant particles are preferably a compound capable of lowering the surface energy, such as particles formed by pulverizing polyethylene, polypropylene, polytetrafluoroethylene and their copolymers. Organic solid lubricant particles formed of polyethylene or polypropylene include polytetrafluoroethylene, co-propylene-poly-ethylene, polyethylene (low density), polyethylene (high density) and polypropylene.

Examples of organic solid lubricant particles include long chain fatty acid amides such as lauric acid amide, palmitic acid amide, stearic acid amide, behenic acid amide, hydroxystearic acid amide, oleic acid amide, erucic acid amide, ricinolic acid amide, N-lauryllauric acid amide, N-palmitylpalmitic acid amide, N-stearylstearic acid amide and N-oleyloleic acid amide; and long chain urea compounds such as N-phenyl-N'-stearylurea, N-stearyl-N'-stearylurea and xyllene bis stearylurea.

Organic solid lubricants are used preferably in the form of being dispersed in a coating solution. The organic solid lubricants, which have slippery surfaces, often do not exhibit sufficient affinity to water or an organic solvent. When stability of the dispersion is lowered, coagulation or precipitation often occurs. Coagulation of precipitation in a coating solution often causes coating defects in the course of conversion to film. To enhance stability of a dispersion, there are employed an electrostatic effect by surface modification or a steric hindrance effect by using a surface adsorption layer of a polymeric surfactant. The former is a general method for stabilizing dispersion but there are concerns that a surface modifier affects other performance. Accordingly, the latter, which easily displays effects not only in an aqueous system but also in non-aqueous system, is preferred.

A binder used in the photothermographic material is usable as a polymeric dispersing agent. Examples of such a binder include polyvinyl butyral, polyvinyl acetal, polyvinyl alcohol, cellulose acetate butyrate, and cellulose acetate propionate.

A polymeric dispersing agent is used preferably at 1% to 200% by weight of organic solid lubricants. Dispersing is not specifically limited but performed by employing a dissolver, ultrasonic or compression. It is preferred to perform dispersion by using a dispersing apparatus provided with a cooling device to inhibit heat generation.

The average particles of the foregoing organic solid lubricant particles refers to that of the particles having been subjected to the following dispersion procedure. Thus, the average particle size can be determined in such a manner that a dispersion containing a compound relating to the invention is diluted, dropped onto a grid attached with carbon supporting membrane and dried; and the thus dried sample is observed by a transmission electron microscope (e.g., 2000FX type, produced by Nippon Denshi Co., Ltd.) and photographed at a factor of 5,000; the obtained negative image is read in a scanner and the particle size is measured with respect to at least 3,000 particles to determine an average particle size from the arithmetic average.

Fluorinated Surfactant

There are preferably used fluorinated surfactants to improve film transportability in a laser image (thermal processor) and environmental friendliness. Fluorinated surfactants are not specifically limited but include, for example, nonionic or anionic fluorinated surfactants containing an alkyleneoxy group such as ethyleneoxy, propyleneoxy or I-propyleneoxy; ionic fluorinated surfactants, as described in JP-A Nos. 60-244945, 63-306437 and 1-24245; anionic•cationic fluorinated surfactants, as described in JP-A Nos. 5-197068 and 5-204115.

Fluorinated surfactants are used preferably in an amount of from 0.01 to 1 g and more preferably from 50 to 300 mg per $m^2$ of photothermographic material.

Fluorinated surfactants may be incorporated to any layer but preferably an uppermost layer.

Support

Suitable supports used in the photothermographic imaging materials of the invention include various polymeric materials, glass, wool cloth, cotton cloth, paper, and metals (such as aluminum). Flexible sheets or roll-convertible one are preferred. Examples of preferred support used in the invention include plastic resin films such as cellulose acetate film, polyester film, polyethylene terephthalate film, polyethylene naphthalate film, polyamide film, polyimide film, cellulose triacetate film and polycarbonate film, and biaxially stretched polyethylene terephthalate (PET) film is specifically preferred. The support thickness is 50 to 300 μm, and preferably 70 to 180 μm.

To improve electrification properties of photothermographic imaging materials, metal oxides and/or conductive compounds such as conductive polymers may be incorporated into the constituent layer. These compounds may be incorporated into any layer and preferably into a sublayer, a backing layer, interlayer between the light sensitive layer and the sublayer. Conductive compounds described in U.S. Pat. No. 5,244,773, col. 14-20. Specifically, the surface protective layer of the backing layer side preferably contains conductive metal oxides.

The conductive metal oxide is crystalline metal oxide particles, and one which contains oxygen defects or one which contains a small amount of a heteroatom capable of forming a donor for the metal oxide, both exhibit enhanced conductivity and are preferred. The latter, which results in no fogging to a silver halide emulsion is preferred. Examples of metal oxide include $ZnO$, $TiO_2$, $SnO_2$, $Al_2O_3$, $In_2O_3$, $SiO_2$, $MgO$, $BaO$, $MoO_3$ and $V_2O_5$ and their combined oxides. Of these, $ZnO$, $TiO_2$ and $SnO_2$ are preferred. As an example of containing a heteroatom, addition of Al or In to $ZnO$, addition of Sb, Nb, P or a halogen element to $SnO_2$, and addition of Nb or Ta to $TiO_2$ are effective. The heteroatom is added preferably in an amount of 0.01 to 30 mol, and more preferably 0.1 10 mol %. To improve particle dispersibility and transparency, a silicon compound may be added in the course of particle preparation.

The metal oxide particles have electric conductivity, exhibiting a volume resistance of $10^7$ Ω·cm or less and preferably $10^5$ Ω·cm or less. The foregoing metal oxide may be adhered to other crystalline metal oxide particles or fibrous material (such as titanium oxide), as described in JP-A Nos. 56-143431, 56-120519 and 58-62647 and JP-B No. 50-6235.

The particle size usable in this invention is preferably not more than 1 μm, and a particle size of not more than 0.5 μm results in enhanced stability after dispersion, rendering it easy to make use thereof. Employment of conductive particles of 0.3 μm or less enables to form a transparent photothermographic material. Needle-form or fibrous conductive metal oxide is preferably 30 µm or less in length and 1 µm or less in diameter, and more preferably 10 µm or less in length and 0.3 µm or less in diameter, in which the ratio of length to diameter is preferably 3 or more. $SnO_2$ is also commercially available from Ishihara Sangyo Co., Ltd., including SNS10M, SN-100P, SN-100D and FSS10M.

The photothermographic material of this invention is provided with at least one image forming layer as a light-sensitive layer on the support. There may be provided an image forming layer alone on the support but it is preferred to form at least one light-insensitive layer on the image forming layer. For instance, a protective layer may be provided on the image forming layer to protect the image forming layer. Further, to prevent blocking between photothermographic materials or adhesion of the photothermographic material to a roll, a backcoat layer may be provided on the opposite side of the support.

A binder used in the protective layer or the back coat layer can be chosen preferably from polymers having a higher glass transition point (Tg) than a binder used in the image forming layer and exhibiting resistance to abrasion or deformation, for example, cellulose acetate, cellulose butyrate or cellulose propionate.

To control gradation, at least two image forming layers may be provided on one side of the support or at least one image forming layer may be provided on both sides of the support.

It is preferable to prepare the silver salt photothermographic dry imaging material of the present invention as follows. Materials of each constitution layer as above are dissolved or dispersed in solvents to prepare coating compositions. Resultant coating compositions are subjected to simultaneous multilayer coating and subsequently, the resultant coating is subjected to a thermal treatment. "Simultaneous multilayer coating", as described herein, refers to the following. The coating composition of each constitution layer (for example, a photosensitive layer and a protective layer) is prepared. When the resultant coating compositions are applied onto a support, the coating compositions are not applied onto a support in such a manner that they are individually applied and subsequently dried, and the operation is repeated, but are simultaneously applied onto a support and subsequently dried. Namely, before the residual amount of the total solvents of the lower layer reaches 70 percent by weight, the upper layer is applied.

Simultaneous multilayer coating methods, which are applied to each constitution layer, are not particularly limited. For example, are employed methods, known in the art, such as a bar coater method, a curtain coating method, a dipping method, an air knife method, a hopper coating method, and an extrusion method. Of these, more preferred is the pre-weighing type coating system called an extrusion coating method. The extrusion coating method is suitable for accurate coating as well as organic solvent coating because volatilization on a slide surface, which occurs in a slide coating system, does not occur. Coating methods have been described for coating layers on the photosensitive layer side. However, the backing layer and the subbing layer are applied onto a support in the same manner as above.

In this invention, silver coverage is preferably from 0.3 to 1.5 $g/m^2$, and is more preferably from 0.5 to 1.5 $g/m_2$ for use in medical imaging. The ratio of the silver coverage which is resulted from silver halide is preferably from 2% to 18% with respect to the total silver, and is more preferably from 5% to 15%. Further, in the present invention, the number of coated silver halide grains, having a grain diameter (being a sphere equivalent grain diameter) of at least 0.01 µm, is preferably from $1\times10^{14}$ to $1\times10^{18}$ grains $m^2$, and is more preferably from $1\times10^{15}$ to $1\times10^{17}$. Further, the coated weight of aliphatic carboxylic acid silver salts of the present invention is from $10^{-17}$ to $10^{-14}$ g per silver halide grain having a diameter (being a sphere equivalent grain diameter) of at least 0.01 µm, and is more preferably from $10^{-16}$ to $10^{-15}$ g. When coating is carried out under conditions within the aforesaid range, from the viewpoint of maximum optical silver image density per definite silver coverage, namely covering power as well as silver image tone, desired results are obtained.

The photothermographic material of this invention contains solvent preferably at 5 to 1,000 $mg/m^2$ when subjected to thermal development, and more preferably 100 to 500 $mg/m^2$, thereby leading to enhanced sensitivity, reduced fogging and enhanced maximum density. Examples of such a solvents are described, for instance, in JP-A No. 2001-264936, paragraph [0030] but are not limited to thereto. The solvent may be used singly or in combination. The solvent content in the photothermographic material can be controlled by adjusting conditions in the drying stage after coating, for example, temperature conditions. The solvent content can be determined by gas chromatography under the condition suitable for detection of contained solvents.

Exposure

Exposure used in the photothermographic material or the image forming method of this invention can employ various conditions with respect to a light source, exposure time and the like suitable for obtaining an intended appropriate images.

The silver salt photothermographic material of the present invention is preferably exposed using laser light to perform image recording. It is preferable to employ an optimal light source for the spectral sensitivity provided to the aforesaid photosensitive material. For example, when the aforesaid photosensitive material is sensitive to infrared radiation, it is possible to use any radiation source which emits radiation in the infrared region. However, infrared semiconductor lasers (at 780 nm and 820 nm) are preferably employed due to their high power, as well as ability to make photosensitive materials transparent.

Any light source meeting the foregoing is usable in this invention but laser light is preferred. Examples of preferred laser light include a gas laser ($Ar^+$, $Kr^+$, He—Ne), YAG laser, dye laser, and a semiconductor laser. There are also usable semiconductor lasers exhibiting emission in the region of blue to violet (for example, exhibiting a peak intensity at a wavelength of 350 to 440 nm). NLH3000E semiconductor laser, available from Nichia Kagaku Co., Ltd., is cited as a high power semiconductor laser.

In the present invention, it is preferable that exposure is carried out utilizing laser scanning. Employed as the exposure methods are various ones. For example, listed as a preferable method is the method utilizing a laser scanning exposure apparatus in which the angle between the scanning surface of a photosensitive material and the scanning laser beam does not substantially become vertical. "Does not substantially become vertical", as described herein, means that during laser scanning, the nearest vertical angle is preferably from 55 to 88 degrees, is more preferably from 60 to 86 degrees, and is most preferably from 70 to 82 degrees.

When the laser beam scans photosensitive materials, the beam spot diameter on the exposed surface of the photosensitive material is preferably at most 200 µm, and is more preferably at most 100 mm, and is more preferably at most 100 µm. It is preferable to decrease the spot diameter due to the fact that it is possible to decrease the deviated angle from the verticality of laser beam incident angle. Incidentally, the lower limit of the laser beam spot diameter is 10 μm. By performing the laser beam scanning exposure, it is possible to minimize degradation of image quality according to reflection light such as generation of unevenness analogous to interference fringes.

Further, as the second method, exposure in the present invention is also preferably carried out employing a laser scanning exposure apparatus which generates a scanning laser beam in a longitudinal multiple mode, which minimizes degradation of image quality such as generation of unevenness analogous to interference fringes, compared to the scanning laser beam in a longitudinal single mode. The longitudinal multiple mode is achieved utilizing methods in which return light due to integrated wave is employed, or high frequency superposition is applied. The longitudinal multiple mode, as described herein, means that the wavelength of radiation employed for exposure is not single. The wavelength distribution of the radiation is commonly at least 5 nm, and is preferably at least 10 nm. The upper limit of the wavelength of the radiation is not particularly limited, but is commonly about 60 nm.

In the third preferred embodiment of the invention, it is preferred to form images by scanning exposure using at least two laser beams. The image recording method using such plural laser beams is a technique used in image-writing means of a laser printer or a digital copying machine for writing images with plural lines in a single scanning to meet requirements for higher definition and higher speed, as described in JP-A 60-166916. This is a method in which laser light emitted from a light source unit is deflection-scanned with a polygon mirror and an image is formed on the photoreceptor through an fθ lens, and a laser scanning optical apparatus similar in principle to an laser imager.

In the first, second and third preferred embodiments of the image recording method of the invention, lasers for scanning exposure used in the invention include, for example, solid-state lasers such as ruby laser, YAG laser, and glass laser; gas lasers such as He—Ne laser, Ar laser, Kr ion laser, $CO_2$ laser, Co laser, He—Cd laser, $N_2$ laser and eximer laser; semiconductor lasers such as InGa laser, AlGaAs laser, GaAsP laser, InGaAs laser, InAsP laser, $CdSnP_2$ laser, and GSb laser; chemical lasers; and dye lasers. Of these, semiconductor lasers of wavelengths of 600 to 1200 nm are preferred in terms of maintenance and the size of the light source. When exposed onto the photothermographic imaging material in the laser imager or laser image-setter, the beam spot diameter on the exposed surface is 5 to 75 μm as a minor axis diameter and 5 to 100 μm as a major axis diameter. The laser scanning speed is set optimally for each photothermographic material, according to its sensitivity at the laser oscillation wavelength and the laser power.

Thermal Development

In one embodiment of the invention, a photothermographic thermographic material is imagewise exposed and thermally developed to form an image by heating the exposed photothermographic material at a desired temperature using a thermal processor. The thermally development temperature is preferably 110 to 150° C., and more preferably 115 to 135° C. A heating temperature of less than 80° C. cannot obtain a sufficient image density. A higher temperature (specifically, more than 200° C.) often causes transfer onto rollers due to melting of the binder, adversely affecting transferability or the processor. Heating promotes the oxidation reduction reaction between an aliphatic carboxylic acid silver salt (functioning as an oxidizing agent) and a reducing agent to form a silver image. This reaction proceeds without supplying a processing solution such as water from the exterior.

There are usable any heating means, for instance, contact heating with a heating drum or a heating plate, or non-contact heating such as radiation, but contact heating with a heating plate is preferred. The heated surface may be the light-sensitive layer side or the light-insensitive layer side (that is opposite the light-sensitive layer) but is preferably the light-insensitive side in terms of stability to a processing environment. The developing section is preferably composed of a combination of a plurality of independently temperature-controlled zones and plural means, and more preferably having a temperature-retaining zone maintaining a specific development temperature. In a thermal developing apparatus preferably used in the invention, a temperature-raising section and a temperature-retaining section can independently constitute the thermal development process. In the temperature-raising section, a heating means such as a heating member is brought into close contact with a photothermographic sheet film to prevent occurrence of unevenness in density and the temperature-raising section does not need to perform such close contact. Accordingly, the temperature-raising section and the temperature-retaining section can each independently employ an appropriate heating system, thereby achieving more rapid access, a compact apparatus and lowering the cost of the thermal development process, while maintaining high image quality without causing unevenness in density.

In the thermal developing apparatus, the temperature-raising section performs heating, while compressing the photothermographic sheet film onto a plate heater by an opposed roller to bring into contact with the plate heater and the temperature-retaining section heats the sheet film within a slit formed between guides having a heater on at least one side thereof. While compression of a photothermographic sheet film onto a plate heater by an opposed roller can achieve close contact of the sheet film with the plate, the temperature-retaining section can convey the sheet film by conveying force of the opposed roller of the temperature-raising section with heating within the slit, which needs no driving part of a conveying system and requires no high accuracy in slit size, rendering it feasible to achieve a compact apparatus and lowering the cost.

EXAMPLES

The present invention will be further described with reference to examples but is by no means limited to these.

A molecular weight (weight average molecular weight) obtained in examples was determined as below.

Measurement of Weight Average Molecular Weight

A copolymer is dissolved in DMF and the weight average molecular weight of the copolymer is measured in gel permeation chromatography (GPC) using, as a detector, GPC system, produced by Waters Co. (column: Shodex LF-804, produced by Showa Denko Co., Ltd.). DMF (0.1 M-LiBr), as a solver was used at a solvent flow rate of 0.8 ml/min. An approximately 20 mg polymer sample was dissolved in 4 ml of DMF (0.1 M-LiBr) to prepare a sample and 80 μl of the sample was poured into a column. A column temperature was set to 40° C. There was used a RI (differential refractive index) detector. A molecular weight of a polymer was represented by equivalent converted to polystyrene.

Unless otherwise noted, "part(s)" in examples represents part(s) by mass and "%" represents % by mass.

Synthesis Example 1

Synthesis of Copolymer 1

Under a nitrogen environment, 20 g of polymerization initiator VPE-0201 (produced by Wako Junyaku Co.), 60 g of N-isopropylacrylamide (NIPAM) and 20 of stearylacylamide were dissolved in 233 g of ethanol and stirred at 80° C. with gradually heating. After the reaction solution was condensed under reduced pressure, 300 g of water was dropwise added thereto and the formed precipitates were filtered off and dried under reduced pressure to obtain 80 of the objective material. The weight average molecular weight (Mw) was proved to be 135,000 through GPC measurement.

Synthesis Examples 2-10

Synthesis of Copolymers 2-10

Similarly to the foregoing copolymer 1, copolymers 2-10 were synthesized by using initiators and monomers shown in Table 1.

Synthesis Example 11

Synthesis of Copolymer 11

(1) Preparation of Polyethylene Glycol Polymeric Initiator:

20 g of polyethylene glycol (PEG, MW=1000, produced by Polysciences Inc.) was dissolved in 100 ml of anhydrous toluene to obtain a PEG solution. To this PEG solution were added 0.054 g of 4-(dimethylamino)pyridine and 4.45 g of triethylamine. Further thereto, 10.12 g of 2-bromoisobutyryl bromide was dropwise added. After stirring for one night at room temperature, the reaction mixture was condensed under reduced pressure to remove toluene and residual brown liquid was dissolved in 200 ml of dichloromethane. This solution was placed onto a separating funnel and washed successively using 100 ml of a saturated sodium hydrogencarbonate solution, 100 ml of 1M hydrochloric acid and 100 ml of a saturated sodium chloride aqueous solution. Then, the dichloromethane layer was dried by magnesium sulfate, filtered and solvents wee removed under reduced pressure. After dried overnight under vacuum, the product was obtained as a brown oil in an amount 18.0 g at a yield of 68.5%.

(2) Preparation of PNIPAM-PEC-PNIPAM Block Copolymer:

In 20 ml of desalted water were dissolved 11.0 g of N-isopropylacrylamide (produced by KOJIN Co., Limited.) and 2 g of a PEG-polymeric initiator. Dried nitrogen gas was blown through the solution for 45 min. 0.22 g of copper bromide and 0.49 g of 2,2'-dipyridyl were mixed and added to the reaction mixture. When solids were added to the solution, the reaction mixture changed in color to green and an increased viscosity was observed. After mixed for 2 hrs under a nitrogen environment, the reaction solution was poured into a beaker and diluted with 100 of water. Subsequently, the solution was filtered with a silica gel to remove metallic copper. Further, the solution was freeze-dried to obtain 12 g of an objective substance. (PNIPAM=poly(N-isopropylacrylamide)

Comparative Example 12

Synthesis of Copolymer 12

In 180 g of methyl ethyl ketone were dissolved 80 g of N-isopropylacrylamide (NIPAM) and 180 g of stearyl acrylate (SA, produced by Nippon Yushi Co., Ltd.). After heating to 80° C., further thereto, a solution of 0.3 g of lauroyl peroxide (LPO) dissolved in 20 g methyl ethyl ketone was dropwise added in 2 hrs. After completing addition, the solution was refluxed for 6 hrs at 80° C. The reaction solution was allowed to stand to be cooled to room temperature. The formed precipitates were filtered off and dried under reduced pressure to obtain 96 g of copolymer 12 having a molecular weight of 240,000 at a yield of 96%.

TABLE 1

| Copolymer No. | Monomer (g) | | Initiator (g) | Weight Average Molecular Weight |
|---|---|---|---|---|
| 1 | NIPAM (60) | SA (20) | VPE-0201 (20) | 135,000 |
| 2 | NIPAM (60) | PSE-400 (20) | VPE-0201 (20) | 128,000 |
| 3 | DAAM (60) | SA (20) | VPE-0201 (10) | 163,000 |
| 4 | NIPAM (60) | PSE-400 (20) | VPE-0401 (20) | 160,000 |
| 5 | NIPAM (60) | PSE-400 (20) | VPE-0601 (20) | 187,000 |
| 6 | NIPAM (70) | PSE-1000 (20) | VPE-0201 (10) | 175,000 |
| 7 | NIPAM (50) | PSE-1000 (40) | VPE-0201 (10) | 160,000 |
| 8 | NIPAM (80) | | VPE-0201 (20) | 142,000 |
| 9 | SA (80) | | VPE-0201 (20) | 130,000 |
| 10 | PSE-400 (40) | | VPE-0201 (60) | 145,000 |
| 11 | | NIPAM (11) | PEG Initiator (2) | 35,000 |
| 12 | NIPAM (80) | SA (20) | LPO (0.3) | 240,000 |

PSE-400: $CH_2=C(CH_3)COO(CH_2CH_2O)_9C_{18}H_{37}$ (produced by NOF)
PSE-1000: $CH_2=C(CH_3)COO(CH_2CH_2O)_{23}C_{18}H_{37}$ (produced by NOF)
VPE-0201, VPE-0401, VPE-0601 (afore-described)

Example 1

Preparation of Silver Halide Emulsion

Solution A

| Phthalated gelatin (phalation rate: 99%) | 66.2 g |
|---|---|
| Surfactant AO-1 (10% methanol solution) | 10 ml |
| Potassium bromide | 0.32 g |
| Water to make | 5429 ml |

$HO(CH_2CH_2O)_n-(CH(CH_3)CH_2O)_{17}-(CH_2CH_2O)_mH$
(m + n = 5 to 7)

Solution B

| 0.67 mol/l Aqueous silver nitrate solution | 2635 ml |
|---|---|

Solution C

| Potassium bromide | 51.55 g |
|---|---|
| Potassium iodide | 1.47 g |
| Water to make | 660 ml |

Solution D

| | |
|---|---|
| Potassium bromide | 154.9 g |
| Potassium iodide | 4. 41 g |
| Potassium iron (II) hexacyanate (0.5% solution) | 15 ml |
| Iridium hexachloride (1% solution) | 0.93 ml |
| Water to make | 1982 ml |

Solution E 0.4 mol/l aqueous potassium bromide solution
Amount necessary to adjust silver potential Solution F

| | |
|---|---|
| Potassium hydroxide | 0.71 g |
| Water to make | 20 ml |

Solution G

| | |
|---|---|
| Aqueous 56% acetic acid solution | 10 ml |

Solution H

| | |
|---|---|
| Anhydrous sodium carbonate | 1.16 g |
| Water to make | 107 ml |

Using a stirring mixer described in JP-B No. 58-58288, 1/4 of solution B, the total amount of solution C were added to solution A by the double jet addition for 4 min 45 sec. to form nucleus grains, while maintaining a temperature of 35° C. and a pAg of 8.09. After 1 min., the total amount of solution F was added thereto, while the pAg was approximately controlled using solution E. After 6 min, 3/4 of solution B and the total amount of solution D were further added by the double jet addition for 14 min 15 sec., while mainlining a temperature of 35° C. and a pAg of 8.09. After stirring for 5 min., the reaction mixture was lowered to 30° C. and solution G1 was added thereto to coagulate the resulting silver halide emulsion. Remaining 2000 ml of precipitates, the supernatant was removed and after adding 10 lit. water with stirring, the silver halide emulsion was again coagulated. Remaining 1500 ml of precipitates, the supernatant was removed and after adding 10 lit. water with stirring, the silver halide emulsion was again coagulated. Remaining 1500 ml of precipitates, the supernatant was removed and solution H was added. The temperature was raised to 60° C. and stirring continued for 100 min. Finally, the pH was adjusted to 5.8 and water was added there so that the weight per mol of silver was 1150 g, and light-sensitive silver halide emulsion was thus obtained.

It was proved that the resulting emulsion was comprised of monodisperse silver iodobromide cubic grains having an average grain size of 0.043 μm and a [100] face ratio of 92%.

Preparation of Silver Halide Amphiphilic Dispersion

There was weighed out 7.5 g of each of the foregoing copolymers 1, 2 and 10, copolymer I (corresponding to a copolymer described in Synthesis Example 5 of JP-A No. 2001-288233) and copolymer II (corresponding to a copolymer described in Example 1 of JP-A No. 2002-97236), as described below and 38 g of methanol was added thereto and the respective copolymers were dissolved with stirring at 45° C. Further thereto, 42 g of the foregoing silver halide emulsion maintained at 45° C. was added in 2 min. and stirred for 30 min. Thus prepared solution was cooled to 30° C. and 500 g of methyl ethyl ketone (MEK) was added thereto and the mixture was subjected to distillation under reduced pressure until the water content of the mixture reached 5%. Finally, together with 50 g of a 10% polyvinyl butyral solution, MEK was added so that the total weight was 157 g, whereby silver halide grain amphiphilic dispersions ii-vi.

A comparative sample (sample i) was similarly obtained, provided that only methanol was used without using a copolymer.

Copolymer I: (polyethylene glycol/acrylamide/N-hexylacrylamide Copolymer)

In 500 ml of ethanol were dissolved 30 g of VPE-0601 (produced by Wako Junyaku Co.), 30 g of acrylamide and 1 g of N-hexylacrylamide and after stirred at room temperature for 1 hr. under a stream of nitrogen, the reaction mixture was gradually heated and maintained at 90° C. for 12 hrs with stirring. After the reaction mixture was concentrated under reduced pressure, methyl ethyl ketone was added and a separated precipitate was filtered off and dried under reduced pressure to obtain a targeted material.

Copolymer II: (polyoxyethylene/dimethylaminoethyl Acrylate/Acrylamide Copolymer)

Into a stainless steel Dewar vessel were added an aqueous solution of quaternary methylchloride salt of dimethylaminoethyl acrylate (hereinafter, also denoted as DAC) and an aqueous acrylamide solution (hereinafter, also denoted as AM) in amounts of 60.0 mol % and 40.0 mol %, respectively and distilled water was further added so that the total mass was 1 kg and the total monomer concentration was 46% by mass. Subsequently, the solution was controlled at a temperature of 15° C. for 60 min., while blowing nitrogen gas. Then, cupric chloride in an amount of cupric ions of 0.3 ppm, based on the total mass of monomers, 1.4% by weight of an azo type RO initiator [trade name: VPE-0201, produced by Wako Junyaku Co., corresponding to a compound of the afore-mentioned formula (2) in which m is approximately 40-50 and n is approximately 5-10] and sodium hydrogensulfite ($NaHSO_3$) in an amount of 70 ppm were added to start polymerization and allowed to stand for 1 hr. to continue polymerization. Then, a water-soluble copolymer was obtained in a water-containing gel form, taken out of the Dewar vessel and finely cut, which was dried at 50° C. for 5 hrs. and ground to obtain a targeted copolymer.

Evaluation of Sample

Amphiphilic dispersions prepared above were each measured with respect to particle size. MEK was placed in a cell used for particle size measurement, and each of samples was added thereto and measured in a laser diffraction type particle size distribution measurement apparatus (SALD-3100, produced by Shimazu Seisakusho). Results thereof are shown in Table 2.

TABLE 2

| Sample | Copolymer | Average Particle Size | Remark |
|---|---|---|---|
| i | — | *1 | Comp. |
| ii | copolymer I | 183 nm | Inv. |
| iii | copolymer II | 380 nm | Inv. |
| iv | copolymer 1 | 58 nm | Inv. |
| v | copolymer 2 | 50 nm | Inv. |
| vi | copolymer 10 | 53 nm | Inv. |

*1: It was aggregated and was not measurable

As shown in Table 2, an amphiphilic dispersion of silver halide grains, which was prepared by using a copolymer of the invention together with a hydrophilic, silver halide emulsion, dispersed efficiently grains in an organic solvent without causing coagulation of the grains.

Example 2

Preparation of Subbed Support

A photographic support comprised of a biaxially oriented polyethylene terephthalate film with blue tinted at an optical density of 0.113, which had been subjected to corona discharge treatment of 10 W·minute/m² on both sides, was subjected to subbing. Namely, the following backing lower sublayer coating solution was coated and dried at 140° C. to form a 0.06 μm lower sublayer. Subsequently, the following backing upper sublayer coating solution was coated and dried at 140° C. to form a 0.2 μm upper sublayer. On the other side of the support, the following coating solution of a lower sublayer of the light-sensitive layer side was coated and dried at 140° C. to form a lower sublayer with a dry thickness of 0.25 μm. Further thereon, the following backing upper sublayer coating solution was coated and dried at 140° C. to form a 0.06 μm thick upper sublayer of the light-sensitive layer side. The thus coated support was thermally treated at 140° C. for 2 min. to obtain a subbed support.

Backing Lower Sublayer Coating Solution

| | |
|---|---|
| Copolymer latex of Styrene/glycidyl methaacrylate/butyl acrylate (20/20/40). 30% solids | 16.0 g |
| Copolymer latex of Styrene/butyl acrylate/hydroxymethyl methacrylate (25/45/30). 30% solids | 4.0 g |
| SnO₂ sol (10% solids), synthesized JP-A No. 10-059720 | 91 g |
| Surfactant SA-1 | 0.5 g |
| Distilled water to make | 1000 ml |

Backing Upper Sublayer Coating Solution

| | |
|---|---|
| Modified aqueous polyester* (18% solid) | 215.0 g |
| Surfactant SA-1 | 0.4 g |
| Spherical silica matting agent Sea Hoster KE-P50 (Produced by Nippon Shokubai Co., Ltd.) | 0.3 g |
| Distilled water to make | 1000 ml |

SA-1: 4-$(C_9H_{19})_2$—$C_6H_3$—$(ch_2CH_2O)_{12}SO_3Na$

Synthesis of Water-based Modified Polyester

A mixture consisting of 35.4 parts by weight of dimethyl terephthalate, 33.63 parts by weight of dimethyl isophthalate, 17.92 parts by weight of sodium salt of dimethyl 5-sulfoisophthalate, 62 parts by weight of ethylene glycol, 0.065 part by weight of calcium acetate monohydrate, and 0.022 part by weight of manganese acetate tetrahydrate underwent trans-esterification at 170 to 220° C. under a flow of nitrogen while distilling out methanol. Thereafter, 0.04 parts by weight of trimethyl phosphate, 0.04 part by weight of antimony trioxide, and 6.8 parts by weight of 4-cyclohexanedicarboxylic acid were added. The resulting mixture underwent esterification at a reaction temperature of 220 to 235° C. while a nearly theoretical amount of water being distilled away. Thereafter, the reaction system was subjected to pressure reduction and heating over a period of one hour and was subjected to polycondensation at a final temperature of 280° C. and a maximum pressure of 133 Pa for one hour, whereby a precursor of a water-soluble polyester was synthesized. The intrinsic viscosity of the precursor was 0.33.

Subsequently, 850 ml of pure water was placed in a 2-liter three-necked flask fitted with stirring blades, a refluxing cooling pipe, and a thermometer, and while rotating the stirring blades, 150 g of water-soluble polyester A-1 was gradually added. The resulting mixture was stirred at room temperature for 30 minutes without any modification. Thereafter, the interior temperature was raised to 98° C. over a period of 1.5 hours and at that resulting temperature, dissolution was performed over a period of 3 hr. Thereafter, the temperature was lowered to room temperature over a period of one hour and the resulting product was allowed to stand overnight to obtain a precursor solution having a solid content of 15% by weight.

Into a 3-liter four-necked flask fitted with stirring blades, a reflux cooling pipe, a thermometer, and a dripping funnel was put 1,900 ml of the foregoing precursor solution, and the interior temperature was raised to 80° C., while rotating the stirring blades. Into this was added 6.52 ml of a 24 percent aqueous ammonium peroxide solution, and a monomer mixed liquid composition (consisting of 28.5 g of glycidyl methacrylate, 21.4 g of ethyl acrylate, and 21.4 g of methyl methacrylate) was dripped over a period of 30 minutes, and reaction was allowed for an additional 3 hours. Thereafter, the resulting product was cooled to at most 30° C., and filtrated, whereby water-based modified polyesters solution A having a solid content of 18% by weight was obtained.

Image Forming Layer Side Lower Sublayer Coating Solution

| | |
|---|---|
| Copolymer latex of Styrene/acetoacetoxyethyl methacrylate/glycidyl methaacrylate/n-butyl acrylate (40/40/20/0.5). 30% solids | 70.0 g |
| Surfactant SA-1 | 0.3 g |
| Distilled water to make | 1000 ml |

Image Forming Layer Side Upper Sublayer Coating Solution

| | |
|---|---|
| Modified water-based polyester* (18% solid) | 80.0 g |
| Surfactant SA-1 | 0.4 g |
| Spherical silica matting agent Sea Hoster KE-P50 | 0.3 g |
| Water to make | 1000 ml |

The solid content of the coating solution was 0.5%.
*Water-based modified polyester The solid content of the coating solution was 0.5%.

*Water-based Modified Polyester

Water-based modified polyester solution having a solid content of 18% was prepared similarly to the foregoing water-based modified polyester, except that the composition was replaced by 1800 ml of a modified water-based polyester precursor solution and a monomer mixture of 31 g of styrene, 31 g of acetoacetoxyethyl methacrylate, 61 g of glydyl methacrylate and 7.6 g of n-butyl acrylate.

Preparation of Silver Aliphatic Carboxylate Emulsion

Preparation of Silver Halide Emulsion

Solution A

| Phthalated gelatin (modification rate of 99%) | 66.2 g |
| Surfactant AO-1 (10% methanol solution) | 10 ml |
| Potassium bromide | 0.32 g |
| Water to make | 5429 ml |

AO-1: $HO(CH_2CH_2O)_n(CH(CH_3)CH_2O)_{17}(CH_2CH_2O)_mH$
(m + n = 5 − 7)

Solution B

| 0.67 mol/L aqueous silver nitrate solution | 2635 ml |

Solution C

| Potassium bromide | 51.55 g |
| Potassium iodide | 1.47 g |
| Water to make | 660 ml |

Solution D

| Potassium bromide | 154.9 g |
| Potassium iodide | 4.41 g |
| Potassium hexacyanoiron (II) (0.5% aqueous solution) | 15 ml |
| Potassium hexachloroiridate (III) (1% aqueous solution) | 0.93 ml |
| Water to make | 1982 ml |

Solution E 0.4 mol/L aqueous potassium bromide solution in an amount to control silver potential Solution F

| Potassium hydroxide | 0.71 g |
| Water to make | 20 ml |

Solution G

| 56% aqueous acetic acid solution | 10.0 ml |

Solution H

| Sodium carbonate anhydride | 1.16 g |
| Water to make | 107 ml |

Upon employing a mixing stirrer shown in JP-B No. 58-58288, 1/4 portion of solution B and whole solution C were added to solution A over 4 minutes 45 seconds, employing a double-jet precipitation method while adjusting the temperature to 35° C. and the pAg to 8.09, whereby nuclei were formed. After one minute, whole solution F was added. During the addition, the pAg was appropriately adjusted employing Solution E. After 6 minutes, 3/4 portions of solution B and whole solution D were added over 14 minutes 15 seconds, employing a double-jet addition method while adjusting the temperature to 35° C. and the pAg to 8.09. After stirring for 5 minutes, the mixture was heated to 30° C., and whole solution G was added, whereby a silver halide emulsion was flocculated. Subsequently, while leaving 2000 ml of the flocculated portion, the supernatant was removed, and 10 liters of water was added. After stirring, the silver halide emulsion was again flocculated. While leaving 1,500 ml of the flocculated portion, the supernatant was removed. Further, 10 liters of water was added. After stirring, the silver halide emulsion was flocculated. While leaving 1,500 ml of the flocculated portion, the supernatant was removed. Subsequently, solution H was added and the resultant mixture was heated to 60° C., and then stirred for an additional 100 minutes. Finally, the pH was adjusted to 5.8 and water was added so that the weight was adjusted to a finish of 1,150 g, whereby a light-sensitive silver halide emulsion was prepared.

The prepared emulsion was comprised of monodisperse cubic silver iodobromide grains having an average grain size of 0.043 μm and a (100) crystal face ratio of 92 percent.

Preparation of Amphiphilic Silver Halide Grain Dispersion

There was weighed out 7.5 g of each of copolymers 1-12 and 38 g of methanol was added and stirred at 45° C. for 30 min. to dissolve the copolymers. Further thereto, 42 g of the foregoing silver halide emulsion kept at 45° C. was added over 2 min. and stirred for 30 min. The solution was cooled to 30° C., MEK was added thereto and distillated under reduced pressure until reached a water content of less than 5%. Finally, MEK was added together with 50 g of 109% polyvinyl butyral MEK solution so that the total amount was 157 g, whereby amphiphilic silver halide grain dispersions 1-12 were obtained.

To 1850 g of aliphatic carboxylic acids (behenic acid: arachidic acid:stearic acid=85:11:4 in molar ratio) and 90% of water required to make a concentration of 5% was added 1036 ml of an aqueous 5 mol/L potassium hydroxide solution over 5 min. while stirring at 85° C. and the mixture was further reacted for 60 min., whereby an aqueous solution of potassium aliphatic carboxylate was obtained. Subsequently water was further added so as to form an aqueous solution of 5% potassium aliphatic carboxylate. Separately, 38,000 g of an aqueous 5% silver nitrate solution was prepared and maintained at 10° C. There were prepared pumps capable of supplying an aqueous potassium aliphatic carboxylate solution and an aqueous silver nitrate solution at a constant flow rate. There was also prepared a reaction apparatus in which the solutions were able to react in a Y-shape mixing device.

The aqueous potassium aliphatic carboxylate solution and the aqueous silver nitrate solution were each added at a constant flow rate for 4 min. and the solution which came out of the lower portion of the Y-shape tube was stocked. A stock tank was maintained at 35° C. during addition. Thereafter, solids were suction-filtered off and washed with water at 25° C. until reached a conductivity of 30 µS/cm. The thus obtained cake was dewatered and dried to obtain a dried powder of a silver aliphatic carboxylate.

Preparation of Silver Aliphatic Carboxylate Emulsion

In 1239 g of MEK was dissolved 41 g of polyvinyl butyral (S-Lec B•BL-SHP, produced by SEKISUI CHEMICAL CO., LTD.) and 412 g of powdery silver aliphatic carboxylate was gradually added thereto and sufficiently mixed with stirring by using dissolver DISPERMAT CA-40M type (produced by VMG-GETZMANN Co.) to prepare an preliminary dispersion. After completing addition of the powdery silver aliphatic carboxylate, stirring was conducted for 15 min. The prepared preliminary dispersion was charged into a media type homogenizer DISPERMAT Type SL-C12EX (manufactured by VMA-Getzmann Co.), filled with 0.5 mm diameter zirconia beads (Toreselam, produced by Toray Co.) so as to occupy 80 percent of the interior volume so that the retention time in the mill reached 1.2 minutes and was dispersed at a peripheral rate of the mill of 9 m/second to obtain a silver aliphatic carboxylate emulsion having 27% solids.

Preparation of Powdery Silver Halide-containing Silver Aliphatic Carboxylate C

Organic acids of 130.8 g of behenic acid, 67.7 g of arachidic acid, 43.6 g of stearic acid and 2.3 g f palmitic acid were mixed and dissolved with adding 4720 ml of pure water. Subsequently, 540.2 ml of an aqueous 1.5 mol/L sodium hydroxide solution was added and after adding 6.9 ml of concentrated nitric acid, the reaction mixture was cooled to 55° C. to obtain a sodium aliphatic carboxylate mixture solution. While this sodium aliphatic carboxylate mixture solution was maintained at 55° C. under the light-shielding condition (hereinafter, the light-shielding condition continued), 45.3 g of the above-described light-sensitive silver halide emulsion and 450 ml of pure water were added and stirred for 5 min. Then, 702.6 ml of an aqueous 1 mol/L silver nitrate solution was added over 2 min and stirred over 10 min to obtain a silver halide grain-containing organic silver salt dispersion C.

Then, the obtained silver halide grain-containing organic silver salt dispersion C was transferred to a washing vessel, stirred with adding deionized water and allowed to stand, whereby a flocculated organic silver salt was allowed to float and was separated, and the lower portion, containing water-soluble salts, were removed. Thereafter, washing was repeated employing deionized water until electric conductivity of the resultant effluent reached 2 µS/cm. After centrifugal dehydration, the resultant cake-shaped aliphatic carboxylic acid silver salt was dried employing a fluidized-bed dryer (Mizet Dryer, produced Dalton Co.), while setting the drying conditions such as nitrogen gas as well as heating flow temperature at the inlet of the dryer (65° C. at the inlet and 40° C. at the outlet), until its moisture content reached 0.1 percent, whereby powdery silver halide-containing organic silver salt C was prepared.

Preparation of Light-sensitive Emulsion C

In 2000 g of methyl ethyl ketone (hereinafter referred to as MEK) was dissolved 26.26 g of polyvinyl butyral (Butvar B-79, Produced by Monsanto Co.) as a dispersion binder. While stirring by dissolver DISPERMAT Type CA-40M (manufactured by VMA-Getzmann Co.), 500 g of the foregoing powdery silver halide-containing organic silver salt C was gradually added and sufficiently mixed, and preliminary dispersion C was thus prepared.

The preliminary dispersion C, prepared as above, was charged into a media type homogenizer DISPERMAT Type SL-C12EX (manufactured by VMA-Getzmann Co.), filled with 0.5 mm diameter zirconia beads (Toreselam, produced by Toray Co.) so as to occupy 80 percent of the interior volume so that the retention time in the mill reached 1.5 minutes and was dispersed at a peripheral rate of the mill of 8 m/second, whereby light-sensitive emulsion dispersed solution was prepared.

Coating of Image Forming Layer, Surface Protective Layer and Back Layer

On a sublayer on the image forming layer side of the subbed support was coated an image forming layer at a total silver coverage of 1.32 g/m$^2$ and further thereon was coated a surface protective layer at a wet-coating amount of 23 g/m$^2$. Subsequently, on a sublayer on the side opposite the image forming layer was coated a back layer at a wet-coating amount of 25 g/m$^2$. Drying for each layer was conducted at 60° C. for 15 min. The thus both-sided coating samples were each subjected to a heating treatment at 79° C. for 10 min. to obtain a photothermographic material.

Preparation of Image Forming Layer Coating Solution A-1 to A-12

To 1692 g of the silver aliphatic carboxylate emulsion was added 157 g of each of amphiphilic silver halide grain dispersions 1-12, as prepared above and maintained at 18° C. with stirring. Then, 9.4 g of bis(dimethylacetoamide)dibromobromate (11% methanol solution) was added and stirred for 1 hr. Subsequently, 11.3 g of calcium bromide (11% methanol solution) was added and stirred for 30 min. Then, an infrared-sensitizing dye solution, as described below, was added and stirred for 1 hr., thereafter, the temperature was lowered to 13° C. and stirring was further conducted for 30 min. Further thereto, 242 g of a binder resin shown in Table 1 was added and dissolved, while being maintained at 13° C. After confirmation of dissolution, 37 g of tetrachlorophthalic acid (4.3% MEK solution) and compounds described below were added at intervals of 15 min. to obtain image forming layer coating solutions A-1 to A-12.

| | |
|---|---|
| Phthalazine | 12.9 g |
| Desmodur N3300 (produced by Mobay Chemical Co. aliphatic polyisocyanate) | 8.1 g |
| Leuco Dye-1 | 1.4 g |
| Leuco Dye-2 | 0.6 g |
| Antifoggant solution | as described below |
| Developer solution | as described below |

Preparation of Image Forming Layer Coating Solution C

An image forming layer coating solution C was prepared similarly to the foregoing image forming layer coating solutions A-1 to A-12, except that 1692 g of silver aliphatic carboxylate emulsion and 157 g of amphiphilic silver halide dispersion were replaced by the foregoing light-sensitive emulsion C.

Preparation of Infrared-sensitizing Dye Solution

In 135 g of MEK were dissolved 200 mg of infrared-sensitizing dye 1, 200 mg of infrared-sensitizing dye 2, 100 mg of 5-methyl-2-methylmercaptobenzimidazole, 16 g of 2-chlorobenzoic acid and 1.5 g of a sensitizing dye dissolver, whereby an infrared-sensitizing dye solution 1 was prepared.

Preparation of Developer Solution 0.42 mol of a reducing agent (exemplified compound 1-1) and dye-A were dissolved in MEK and made to 800 g to obtain a developer solution.

16 g of tribromomethylsulfonylpyridine was dissolved in MEK and made to 180 g to obtain an antifoggant solution.

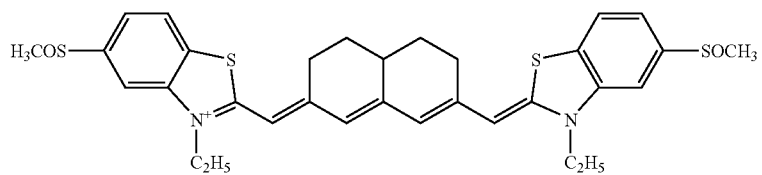

Infrared-sensitizing dye 1

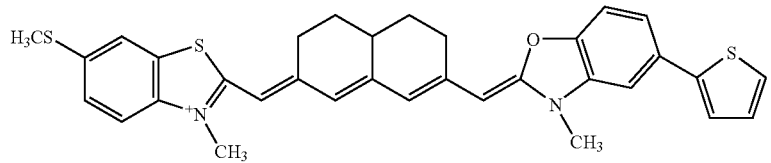

Infrared-sensitizing dye 2

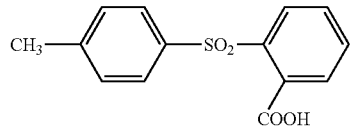

Sensitizing dye dissolver

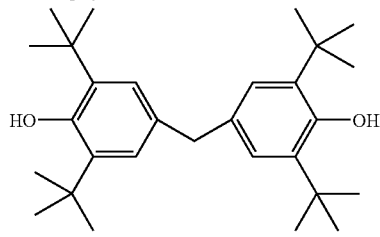

Leuco dye 1

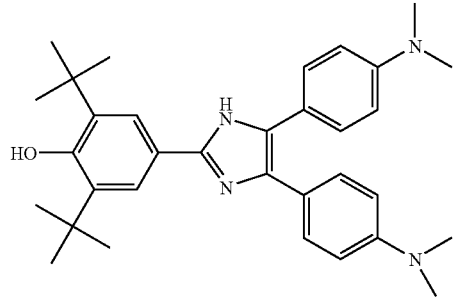

Leuco dye 2

Surface Protective Layer Coating Solution

| | |
|---|---|
| MEK | 1056 g |
| Cellulose acetate butyrate (CAB171-15, Eastman Chemical Co.) | 148 g |
| Polymethyl methacrylate (Paraloid, Rohm & Haas Co.) | 6 g |
| Calcium stearate (MC-2, produced by Nippon Yushi Co., Ltd.) | 3 g |
| Crosslinking agent ($CH_2$=$CHSO_2CH_2$)$_2$CH(OH) | 2.5 g |
| Benzotriazole | 2.0 g |
| Fluorinated surfactant $C_9F_{17}O(CH_2CH_2O)_{23}C_9F_{17}$ | 5.4 g |

Back Layer Coating Solution

| | |
|---|---|
| MEK | 1350 g |
| Cellulose acetate Propionate (CAP482-20, Eastman Chemical Co.) | 155 g |
| Dye-A | 0.23 g |
| Dye-B | 0.81 g |
| Fluorinated acryl copolymer (optoflon FM450) | 1.6 g |
| Noncrystalline saturated polyester (biron 240P, produced by TOYOBO Co.) | 12 g |
| Spherical crosslinking agent (MBX-8, Produced by Sekisui Chemical Co.) | 4.0 g |
| Surfactant $C_9F_{17}O(CH_2CH_2O)_{23}C_9F_{17}$ | 7.1 g |
| Surfactant $LiO_3S(CF_2)_3SO_3Li$ | 1.1 g |

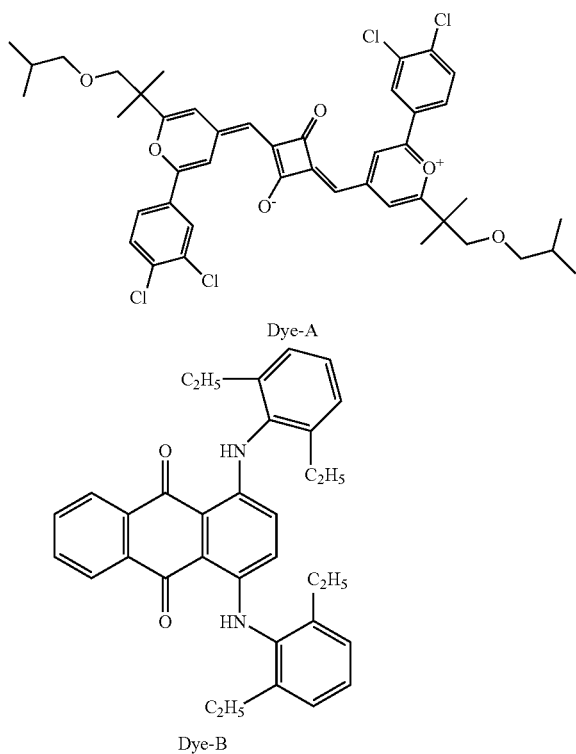

Dye-A

Dye-B images. Herein, the expression, being concurrently exposed and developed means that, in one sheet of a photothermographic material, while one portion is exposed, another portion after having being exposed, is developed at the same time. In other words, exposure and thermal development are concurrently performed in the photographic material. The distance between the exposure section and the development section was 12 cm and the line speed was 30 mm/sec., in which the transport speed of from the photothermographic material-supplying section to the image exposure section, that at the image exposure section and that at the thermal development section were each 30 mm/sec. Exposure was stepwise performed with decreasing exposure energy by 0.05 in log E.

The images obtained as above were subjected to densitometry and there were prepared characteristic curves in which the abscissa indicated the exposure amount and the ordinate indicated the density. Utilizing the resulting characteristic curve, sensitivity (also denoted simply as "S") was defined as the reciprocal of an exposure amount necessary to give a density higher than the unexposed area by 1.0 (i.e., the density of 1.0 plus the density of the unexposed area). The density of an unexposed area (i.e., minimum density or fog density, also denoted simply as "Fog") and the maximum density (also denoted as "Dmax") were also determined. The sensitivity was represented by a relative value, based on the sensitivity of sample b aged under the aging I being 100.

Results are shown in Table 3.

TABLE 3

| Sample | Copolymer | Coating Solution*[1] | Aging I S | Aging I Fog | Aging I Dmax | Aging II S | Aging II Fog | Aging II Dmax | Remark |
|---|---|---|---|---|---|---|---|---|---|
| a | — | C | 90 | 0.23 | 2.8 | 80 | 0.35 | 2.7 | Comp. |
| b | 1 | A-1 | 100 | 0.18 | 3.3 | 98 | 0.20 | 3.2 | Inv. |
| c | 2 | A-2 | 102 | 0.16 | 3.6 | 100 | 0.18 | 3.5 | Inv. |
| d | 3 | A-3 | 101 | 0.18 | 3.2 | 100 | 0.20 | 3.0 | Inv. |
| e | 4 | A-4 | 102 | 0.17 | 3.3 | 99 | 0.19 | 3.2 | Inv. |
| f | 5 | A-5 | 105 | 0.18 | 3.2 | 105 | 0.18 | 3.2 | Inv. |
| g | 6 | A-6 | 105 | 0.17 | 3.7 | 103 | 0.19 | 3.5 | Inv. |
| h | 7 | A-7 | 104 | 0.16 | 3.6 | 101 | 0.20 | 3.6 | Inv. |
| i | 8 | A-8 | 98 | 0.20 | 3.4 | 95 | 0.25 | 3.3 | Inv. |
| j | 9 | A-9 | 100 | 0.18 | 3.2 | 98 | 0.20 | 3.0 | Inv. |
| k | 10 | A-10 | 100 | 0.18 | 3.3 | 96 | 0.20 | 3.2 | Inv. |
| l | 11 | A-11 | 103 | 0.16 | 3.4 | 100 | 0.18 | 3.3 | Inv. |
| m | 12 | A-12 | 88 | 0.21 | 3.1 | 70 | 0.25 | 2.8 | Comp. |

*[1] Coating solution of an image forming layer

Evaluation of Samples

Samples were each evaluated in the manner described below.

The respective samples were aged at 23° C. for 120 hrs. (which was also noted as ageing condition I or aging I). Separately, the samples were also aged at 50° C. and 55% RH for 120 hrs. (which was also denoted aging condition II or aging II). The thus aged samples were each concurrently exposed and developed at 129° C. using a laser imager installed with a 786 nm semiconductor laser exhibiting a maximum output of 50 mW and evaluated with respect to sensitivity, fog density and maximum density of the obtained As shown in Table 3, according to the constitution of the invention, there can be provided photothermographic materials exhibiting a high maximum density, reduced fogging and enhanced sensitivity.

What is claimed is:

1. A photothermographic material comprising on a support a light-insensitive silver salt of an aliphatic carboxylic acid, a light-sensitive silver halide and a reducing agent for silver ions, wherein the photothermographic material further comprises a copolymer comprising a backbone comprising a chain having a monomeric repeating unit, represented by formula (1) and a chain having a monomeric repeating unit, represented by formula (2):

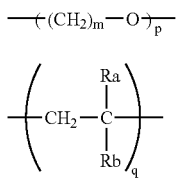

formula (1)

formula (2)

wherein in formula (1), m is 2 or 3 and p is an integer of 5 to 1000; in formula (2), q is an integer of 5 to 1000, Ra is a hydrogen atom or an alkyl group, and Rb is a hydrogen atom or a substituent.

2. The photothermographic material of claim 1, wherein in formula (1), m is 2 and p is an integer of 10 to 500.

3. The photothermographic material of claim 1, wherein in formula (2), Ra is a hydrogen atom or a methyl group.

4. The photothermographic material of claim 1, wherein the chain represented by formula (2) comprises a chain having a monomeric repeating unit, represented by formula (3):

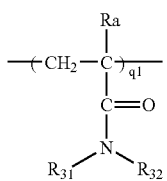

formula (3)

wherein $R_{31}$ and $R_{32}$ are each a hydrogen atom or a substituent; Ra is a hydrogen atom or an alkyl group; q1 is an integer of 5 to 1000.

5. The photothermographic material of claim 4, wherein at least 10% by mol, based on monomeric repeating unit, of the chain represented by formula (2) is accounted for by the chain having a repeating unit, represented by formula (3).

6. The photothermographic material of claim 1, wherein the chain represented by formula (2) comprises a chain having a monomeric repeating unit, represented by formula (4):

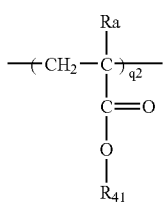

formula (4)

wherein $R_{41}$ is a hydrogen atom or a substituent; Ra is a hydrogen atom or an alkyl group; q2 is an integer of 5 to 1000.

7. The photothermographic material of claim 6, wherein at least 5% by mol, based on monomeric repeating unit, of the chain represented by formula (2) is accounted for by the chain having a repeating unit, represented by formula (4).

8. The photothermographic material of claim 6, wherein $R_{41}$ is an alkyl group having 1 to 30 carbon atoms, a polyoxyethylene group or a polyoxypropylene group.

9. The photothermographic material of claim 1, wherein the chain represented by formula (2) comprises a chain having a monomeric repeating unit, represented by formula (5):

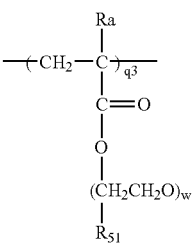

formula (5)

wherein $R_{31}$ is a hydrogen atom or a substituent; w is an integer of 3 to 300; Ra is a hydrogen atom or an alkyl group; q3 is an integer of 5 to 1000.

10. The photothermographic material of claim 9, wherein at least 5% by mol, based on monomeric repeating unit, of the chain represented by formula (2) is accounted for by the chain having a repeating unit, represented by formula (5).

11. A photothermographic material comprising on a support a light-insensitive silver salt of an aliphatic carboxylic acid, a light-sensitive silver halide and a reducing agent for silver ions, wherein the photothermographic material further comprises a copolymer comprising a backbone comprising a chain having a monomeric repeating unit, represented by formula (1), a chain having a monomeric repeating unit, represented by formula (3) and a chain having a monomeric repeating unit, represented by formula (4):

formula (1)

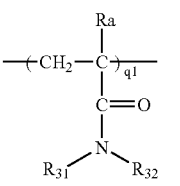

formula (3)

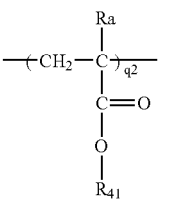

formula (4)

wherein in formula (1), m is 2 or 3 and p is an integer of 5 to 1000; in formula (3), $R_{31}$ and $R_{32}$, are each a hydrogen atom or a substituent, Ra is a hydrogen atom or an alkyl group and q1 is an integer of 5 to 1000; in formula (4), $R_{41}$ is a hydrogen atom or a substituent, Ra is a hydrogen atom or an alkyl group and q2 is an integer of 5 to 1000.

12. A photothermographic material comprising on a support a light-insensitive silver salt of an aliphatic carboxylic acid, a light-sensitive silver halide and a reducing agent for silver ions, wherein the photothermographic material further comprises a copolymer comprising a backbone comprising a chain having a monomeric repeating unit, represented by formula (1) and a chain having a monomeric repeating unit, represented by formula (5):

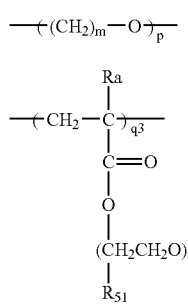

formula (1)

formula (5)

wherein in formula (1), m is 2 or 3 and p is an integer of 5 to 1000; in formula (5), $R_{51}$ is a hydrogen atom or a substituent, w is an integer of 3 to 300, Ra is a hydrogen atom or an alkyl group, and q3 is an integer of 5 to 1000.

13. A copolymer comprising a backbone comprising a chain having a monomeric repeating unit, represented by formula (1) and a chain having a monomeric repeating unit, represented by formula (5):

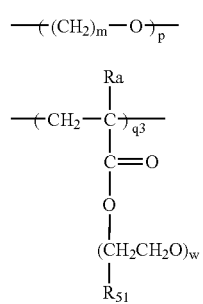

formula (1)

formula (5)

wherein in formula (1), m is 2 or 3 and p is an integer of 5 to 1000; in formula (5), $R_{51}$ is a hydrogen atom or a substituent, w is an integer of 3 to 300, Ra is a hydrogen atom or an alkyl group, and q3 is an integer of 5 to 1000.

* * * * *